US012782950B2

(12) United States Patent
Angot et al.

(10) Patent No.: US 12,782,950 B2
(45) Date of Patent: Nov. 3, 2026

(54) DRONE NAVIGATION METHOD BASED ON OPTICAL DISTORTION AND DRONE USING THE SAME

(71) Applicant: Industrial Technology Research Institute, Hsinchu (TW)

(72) Inventors: Ludovic Angot, Hsinchu City (TW); Yuan-Chu Tai, Hsinchu City (TW)

(73) Assignee: Industrial Technology Research Institute, Hsinchu (TW)

( * ) Notice: Subject to any disclaimer, the term of this patent is extended or adjusted under 35 U.S.C. 154(b) by 118 days.

(21) Appl. No.: 18/986,724

(22) Filed: Dec. 19, 2024

(65) Prior Publication Data

US 2026/0178034 A1 Jun. 25, 2026

(51) Int. Cl.
*G05D 1/24* (2024.01)
*G05D 1/646* (2024.01)
(Continued)

(52) U.S. Cl.
CPC ............... *G05D 1/24* (2024.01); *G05D 1/646* (2024.01); *G06T 7/70* (2017.01); *G05D 2107/70* (2024.01);
(Continued)

(58) Field of Classification Search
CPC ...... G05D 1/24; G05D 1/646; G05D 2109/20; G05D 2107/70; G05D 2111/10;
(Continued)

(56) References Cited

U.S. PATENT DOCUMENTS 11,508,115 B2 * 11/2022 Ackerson ................ G06T 7/557
2011/0206236 A1 * 8/2011 Center, Jr. .............. G06T 7/593
382/103

(Continued)

FOREIGN PATENT DOCUMENTS

CN 107144241 9/2017
CN 110346815 10/2019

(Continued)

OTHER PUBLICATIONS

Robert Bczyk et al., "Vision-Based Mobile Robot Localization With Simple Artificial Landmarks", 7th IFAC Symposium on Robot Control (SYROCO 2003), Sep. 2003, pp. 1-6.

(Continued)

*Primary Examiner* — Matthew J. Reda
(74) *Attorney, Agent, or Firm* — JCIPRNET

(57) ABSTRACT

A drone navigation method based on optical distortion and a drone using the same are provided. The method includes: capturing images of an environment using a drone's camera with high optical distortion properties; detecting a reference object and reference lines in the images; determining cells formed by the reference lines and monitoring curvatures of the lines; determining a reference cell adjacent to the drone; determining the drone's projected position in the reference cell based on curvatures of cell boundaries; determining a target motion direction according to a navigation task and controlling the drone's motion; and continuously updating the drone's projected position based on monitored boundary curvatures to manage the drone's motion. This method enables precise indoor navigation without relying on GPS or external markers, significantly enhancing drone operability in complex indoor environments such as warehouses and industrial facilities.

18 Claims, 12 Drawing Sheets

(51) Int. Cl.
*G06T 7/70* (2017.01)
*G05D 107/70* (2024.01)
*G05D 109/20* (2024.01)
*G05D 111/10* (2024.01)

(52) U.S. Cl.
CPC ...... *G05D 2109/20* (2024.01); *G05D 2111/10* (2024.01); *G06T 2207/10032* (2013.01); *G06T 2207/30244* (2013.01)

(58) Field of Classification Search
CPC . G06T 2207/10032; G06T 2207/30244; G06T 7/70
See application file for complete search history.

(56) References Cited

U.S. PATENT DOCUMENTS

| | | | | |
|---|---|---|---|---|
| 2013/0336583 | A1* | 12/2013 | Ernst | G06T 7/80 382/218 |
| 2018/0022472 | A1 | 1/2018 | Chevalley et al. | |
| 2022/0011779 | A1* | 1/2022 | Kim | B64C 39/024 |

FOREIGN PATENT DOCUMENTS

| | | |
|---|---|---|
| CN | 115932882 | 4/2023 |
| CN | 116229451 | 6/2023 |
| CN | 112258593 | 2/2024 |
| TW | 200741580 | 11/2007 |
| TW | 201439980 | 10/2014 |
| WO | 2018094697 | 5/2018 |

OTHER PUBLICATIONS

Seiji Aoyagi et al., "Position and Orientation Measurement of a Mobile Robot by Image Recognition of Simple Barcode Landmarks and Compensation of Inclinations", with English abstract thereof, T. IEE Japan, 2001, pp. 375-384.
Mark Fiala, "Vision Guided Control of Multiple Robots", Proceedings of the First Canadian Conference on Computer and Robot Vision (CRV'04), May 2004, pp. 1-6.
Joel Vidal et al., "Simple and Robust Localization System Using Ceiling Landmarks and Infrared Light", 12th IEEE International Conference on Control & Automation (ICCA), Jun. 1-3, 2016, pp. 583-587.
Daniel Meyer-Delius et al., "Using Artificial Landmarks to Reduce the Ambiguity in the Environment of a Mobile Robot", 2011 IEEE International Conference on Robotics and Automation, May 9-13, 2011, pp. 5173-5178.
Jihoon Seong et al., "Mobile Robot Localization Using Indistinguishable Artificial Landmarks", 2013 10th International Conference on Ubiquitous Robots and Ambient Intelligence (URAI), Oct. 31-Nov. 2, 2013, pp. 222-224.

* cited by examiner

DRONE NAVIGATION METHOD BASED ON OPTICAL DISTORTION AND DRONE USING THE SAME

BACKGROUND

Technical Field

The present disclosure relates to the field of unmanned aerial vehicle (UAV) navigation systems. More specifically, the present disclosure pertains to a method and drone system for navigating drone in indoor environments using optical distortion properties of camera lenses.

Description of Related Art

In recent years, the use of unmanned aerial vehicles (UAVs), commonly known as drones, has expanded rapidly across various industries. Particularly in warehouse management, industrial inspections, and logistics, drones have shown great potential for improving efficiency and reducing operational costs. However, one of the major challenges in deploying drones for indoor applications is the lack of reliable navigation systems.

Conventional drone navigation methods often rely heavily on Global Positioning System (GPS) technology. While GPS is highly effective for outdoor navigation, it faces significant limitations in indoor environments due to weak or absent satellite signals. This limitation has led to the exploration of alternative navigation methods for indoor drone operations.

Various solutions have been proposed to address this challenge, including the use of radio-frequency identification (RFID) tags, ultra-wideband (UWB) positioning systems, and computer vision-based approaches. However, these solutions often require the installation of additional infrastructure or markers within the environment, which can be costly and time-consuming to implement, especially in large-scale industrial settings.

Computer vision-based navigation systems have shown promise, but they typically rely on complex algorithms for feature detection and mapping, which can be computationally intensive and may struggle in visually monotonous environments such as warehouses with repetitive structures.

Another challenge in indoor drone navigation is maintaining precise positioning and orientation. In warehouse environments, where drones may need to navigate through narrow aisles and perform tasks such as inventory scanning, even small errors in positioning can lead to collisions or incorrect data collection.

These existing technologies, while effective in certain scenarios, often face limitations in terms of cost, computational requirements, or the need for environmental modifications.

SUMMARY

The present disclosure addresses these challenges by introducing a novel method and system for drone navigation based on optical distortion. This approach leverages the inherent distortion characteristics of wide-angle or fisheye lenses, typically considered a drawback in imaging applications, as a means for precise navigation and positioning in indoor environments. It is worth noting that the approach can also be used in outdoor environments. While this optical distortion-based navigation method excels in indoor environments, the approach effectively extends to outdoor applications. The system's ability to leverage reference objects and cell structures for navigation enables robust performance across diverse environmental conditions, extending its utility beyond traditional indoor applications while maintaining precise positional control.

Embodiments relate to a drone navigation method and system that utilizes optical distortion properties for precise indoor navigation. The navigation method leverages the inherent distortion characteristics of wide-angle or fisheye lenses, typically considered a drawback in imaging applications, as a means for precise navigation and positioning in indoor environments.

In one embodiment, the present disclosure provides a drone navigation method that integrates optical distortion for positioning purposes. The method begins with capturing first images of an environment using a drone's camera equipped with high optical distortion properties. During this process, the system detects a reference object within these first images and maps a plurality of reference lines to the reference object. These reference lines form a plurality of cells, and the system continuously monitors the curvature of each reference line to maintain precise positional awareness.

The method further involves determining a reference cell among these cells, specifically selecting the cell adjacent to the drone's current position. Using this reference cell, the system determines the drone's projected position relative to the reference object by analyzing the curvatures of multiple boundaries of the reference cell. This position information enables the system to determine appropriate target motion directions according to the navigation task at hand, allowing precise control of the drone's motion along these predetermined paths.

To maintain accurate positioning throughout the navigation process, the system continuously updates the drone's projected position. This updating process relies on real-time monitoring of the boundary curvatures of the reference cell, enabling dynamic management of the drone's motion according to the current navigation task and updated position information.

In another embodiment, the present disclosure provides a drone specifically designed to implement this optical distortion-based navigation method. The drone incorporates several key components: a camera equipped with high optical distortion properties, a motion device configured for determining motion and velocity along three orthogonal axes in three-dimensional space, and a processor that coordinates these components.

The processor executes various program modules that enable the drone to perform the navigation method described above. These modules control the capture of environmental images, detection of reference objects and lines, formation and monitoring of cell structures, and determination of the drone's projected position. The processor also manages the motion device, controlling the drone's motion based on the navigation tasks and the continuously updated position information.

Based on above, the present disclosure provides a drone navigation method utilizing optical distortion characteristics for indoor positioning. The method employs cameras with high optical distortion properties to detect reference objects and associated reference lines in the captured environment. Through continuous monitoring of reference line curvatures, the system determines the drone's projected position based on boundary curvature analysis and maintains positional awareness through real-time updates. This solution enables indoor navigation without GPS signals or external markers by integrating optical distortion-based positioning with curvature analysis, making it particularly effective for warehouse and industrial facility applications where GPS signals are unavailable. The practical advantage of this approach lies in its ability to leverage existing structural features for navigation while minimizing additional infrastructure requirements, thereby providing a cost-effective solution for indoor drone operations.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1A:
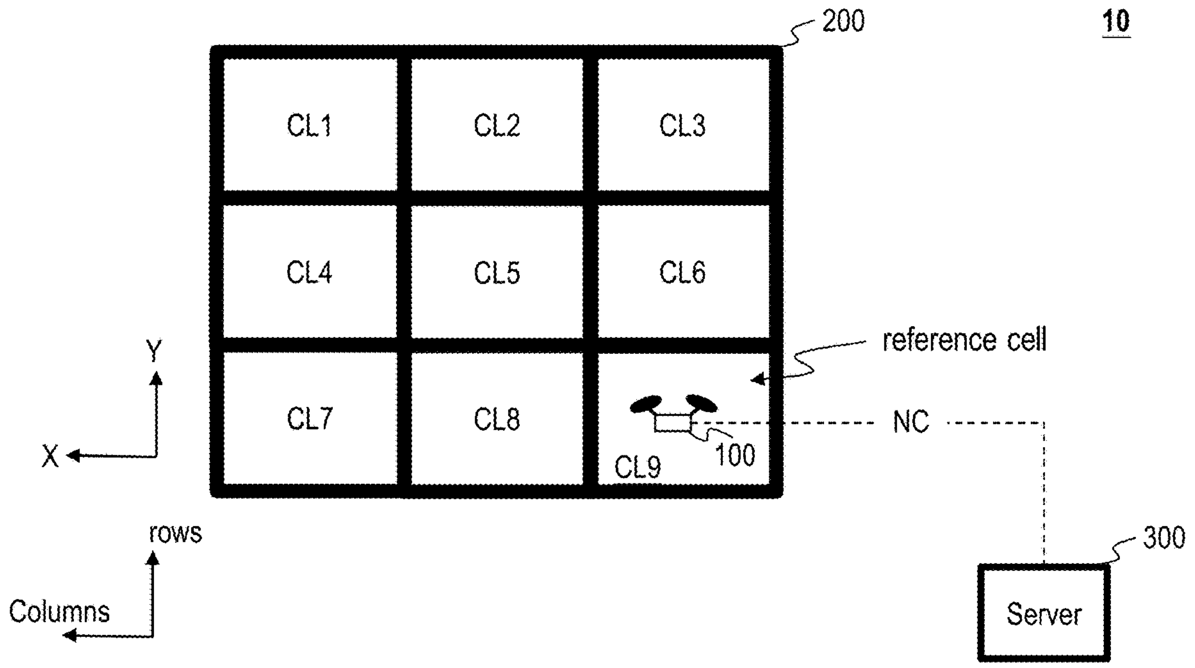
FIG. 1A is a schematic diagram of illustrating a drone system according to an embodiment of the present disclosure.

Examples of said embodiments will now be shown in the accompanying drawings with detailed reference to the embodiments disclosed/disclosed herein. Wherever possible, the same reference numbers are used in the drawings and explanations to refer to the same components or similar components.

It should be understood that the terms "system" and "drone" as used in this disclosure are often used interchangeably. The terms "and/or" in the present disclosure are intended to describe only the associative relationships of related objects, which means that there may be four relationships, e.g., A and/or B, which may mean four scenarios: A, B, A and B, and A or B. In addition, the words "/" in the present disclosure broadly indicate a correlation between related objects. In addition, the character "/" in this disclosure generally indicates that the associated object is in an "or" relationship.

FIG. 1A illustrates a schematic diagram of a drone system according to the present disclosure. In an embodiment, the drone system 10 comprises a reference object 200, a drone 100, and a server 300.

The reference object 200 is shown as a cell structure (also referred to as a grid structure), for example, with multiple cells labeled as CL1 to CL9. This cell structure represents a typical arrangement found in warehouse environments, such as shelving units or storage racks. The reference object 200 serves as a key element for the optical distortion-based navigation method disclosed herein.

The drone 100 is positioned in front of the reference object 200, specifically adjacent to cell CL9, which is identified as the reference cell. The drone 100 is equipped with a camera having a lens with high optical distortion properties, enabling it to capture images of the reference object 200 for navigation purposes.

The server 300 is shown connected to the drone 100 via a network connection NC. This server 300 may be used for various purposes, such as processing complex calculations, storing navigation data, generating and distributing corresponding navigation task or managing multiple drones in a larger system.

The coordinate system shown in FIG. 1A defines the navigation space for the drone 100. The X and Y axes represent the horizontal and vertical directions respectively, while the rows and columns indicate the cell structure of the reference object 200.

In this configuration, the drone 100 utilizes the optical distortion of its camera lens to analyze the curvatures of the cell lines in the captured images of the reference object 200. By monitoring these curvatures, the drone 100 can determine its projected position relative to the reference cell CL9 and navigate accurately within the indoor environment.

This system allows for precise navigation without relying on GPS signals or additional infrastructure, making it particularly suitable for warehouse and industrial applications where traditional navigation methods may be ineffective or impractical.

Figure 1B:
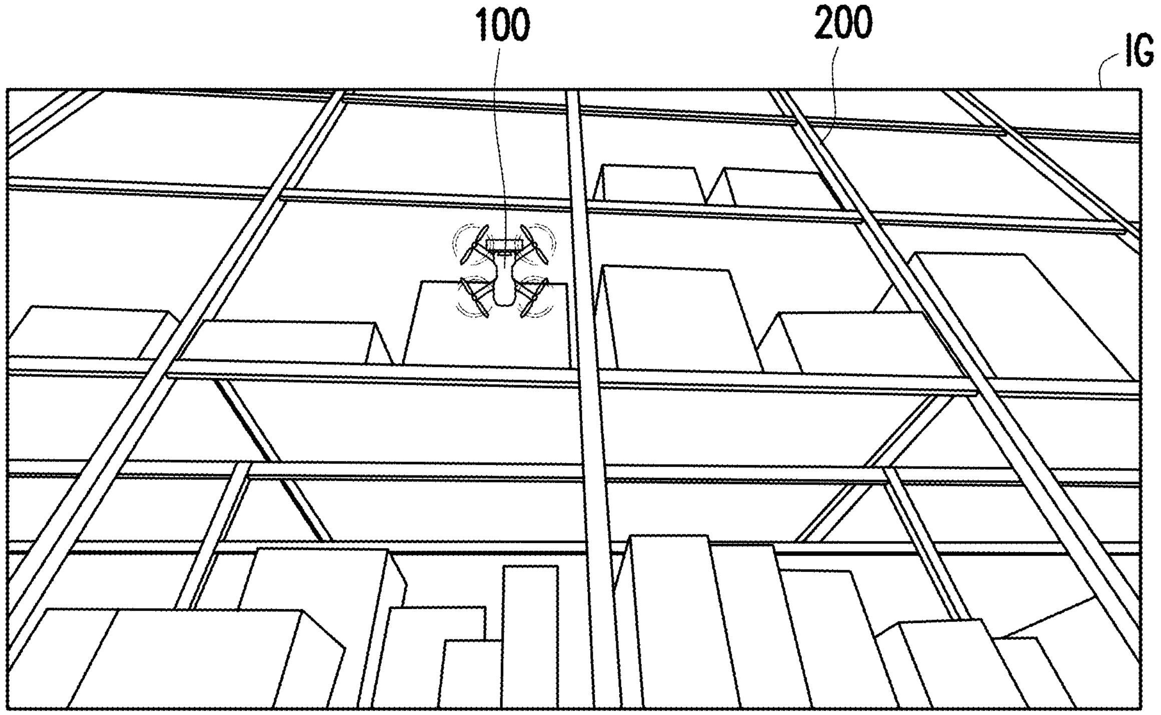
FIG. 1B is a schematic diagram illustrating a drone flying in front of reference object according to an embodiment of the present disclosure.

FIG. 1B is a schematic diagram of illustrating a drone flying in front of reference object according to an embodiment of the present disclosure.

In an embodiment, FIG. 1B illustrates a practical application of the drone navigation system in a warehouse environment. The figure shows a drone 100 flying in front of a reference object 200, which in this case is a warehouse shelving unit.

The reference object 200 is a multi-tiered shelving structure commonly found in warehouses. It consists of metal frames forming a cell-like pattern, with horizontal shelves and vertical supports. The shelves are stocked with various boxed items, representing typical inventory in a warehouse setting.

The drone 100 is positioned in front of the reference object 200, capturing images of the shelving structure. The drone's camera, equipped with a lens having high optical distortion properties, is not directly visible in this image but is implied by the drone's position and orientation relative to the shelving unit.

In this real-world scenario, the drone 100 utilizes the regular pattern of the shelving unit as a reference cell. Each section of the shelving unit, defined by the intersections of horizontal shelves and vertical supports, corresponds to a cell in the navigation system. The drone's navigation algorithm analyzes the distortion patterns of these cell lines mapped on the reference object in the captured image to calculate its position relative to the shelving unit.

Figure 1C:
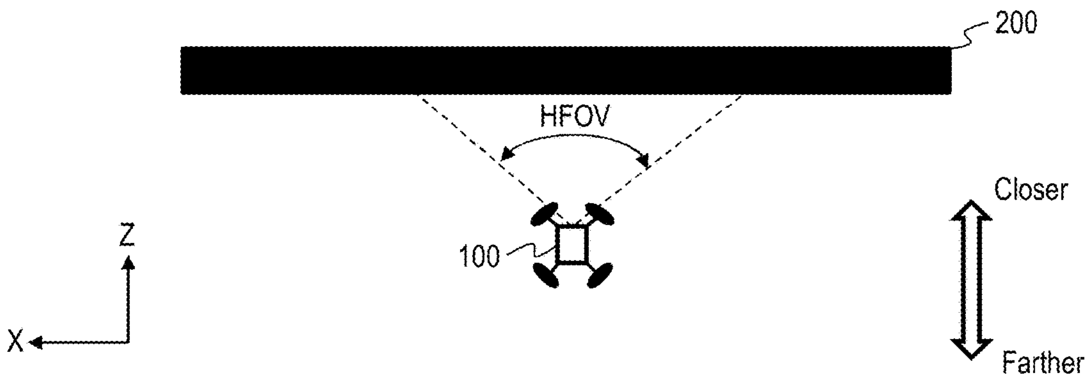
FIG. 1C is a schematic diagram of illustrating a drone navigated by a reference object according to an embodiment of the present disclosure.

FIG. 1C is a schematic diagram of illustrating a drone navigated by a reference object according to an embodiment of the present disclosure.

Referring to FIG. 1C, this bird's-eye view shows demonstrating the spatial relationship between the drone 100 and the reference object 200.

The reference object 200 is depicted as a horizontal bar at the top of the image, representing a structural element such as a shelf or a beam in a warehouse environment. This object serves as the primary reference for the drone's navigation system.

The drone 100 is positioned below the reference object 200, with its camera oriented upwards to capture images of the reference object 200. The horizontal field of view (HFOV) of the drone's camera is indicated by the dashed lines extending from the drone to the reference object 200, forming a cone-like shape. This HFOV determines the area of the reference object 200 visible to the drone 100 at any given time.

The coordinate system shown in the figure defines the navigation space, with the X-axis representing horizontal motion parallel to the reference object 200, and the Z-axis representing vertical motion towards or away from the reference object 200.

A key aspect of this navigation method is the drone's ability to adjust its position based on the captured images. The "Closer" and "Away" arrows on the right side of the figure indicate the drone's potential motions along the Z-axis. These motions are determined by analyzing the curvatures of the reference lines observed in the captured images.

When the drone 100 moves closer to the reference object 200, the curvatures of the reference lines in the captured image become more pronounced due to the increased optical distortion. Conversely, as the drone 100 moves away from the reference object 200, the curvatures become less pronounced, approaching straight lines.

The navigation algorithm continuously processes these changes in curvature to maintain an optimal distance from the reference object 200. If the curvatures become too pronounced, indicating that the drone is too close to the reference object, the system (e.g., the processor of the drone or the server 300) will direct the drone to move away. If the curvatures are too slight, suggesting the drone is too far, the system will guide the drone to move closer.

This dynamic positioning ensures that the drone 100 maintains a consistent and optimal viewing angle of the reference object 200, allowing for accurate navigation and positioning within the indoor environment. By continuously analyzing the optical distortion patterns in real-time, the drone 100 can make precise adjustments to its position, enabling it to navigate effectively along the length of the reference object or maintain a stable position when required.

Figure 9A:
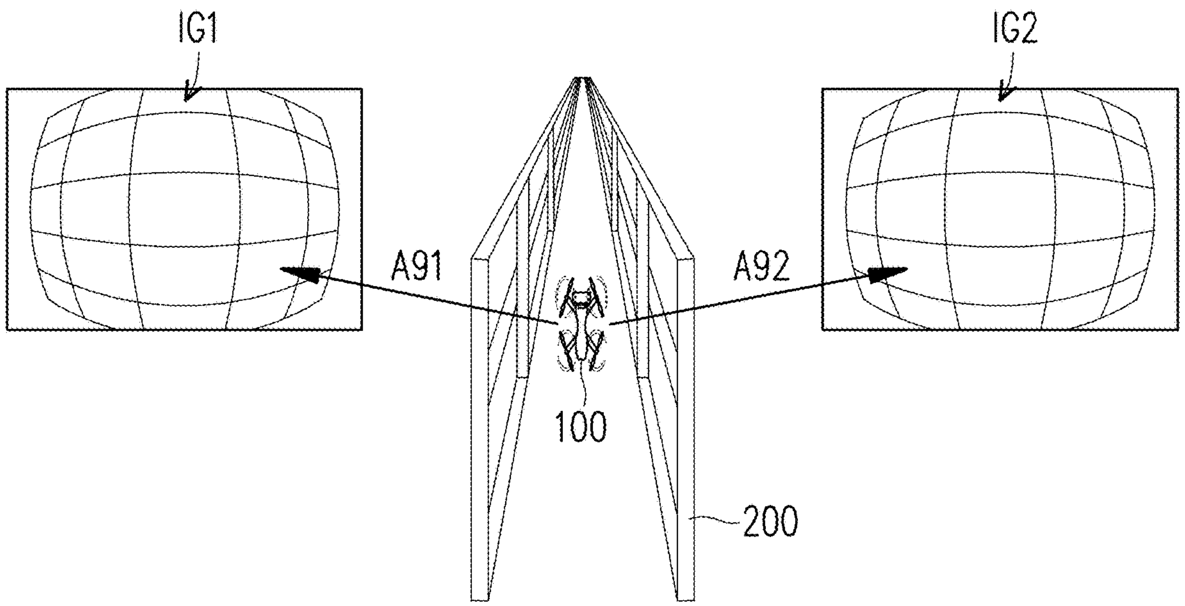
FIG. 9A is a schematic diagram of illustrating reference lines shown by the images captured by the drone when the drone is in the middle of two reference objects according to an embodiment of the present disclosure.
Figure 9B:
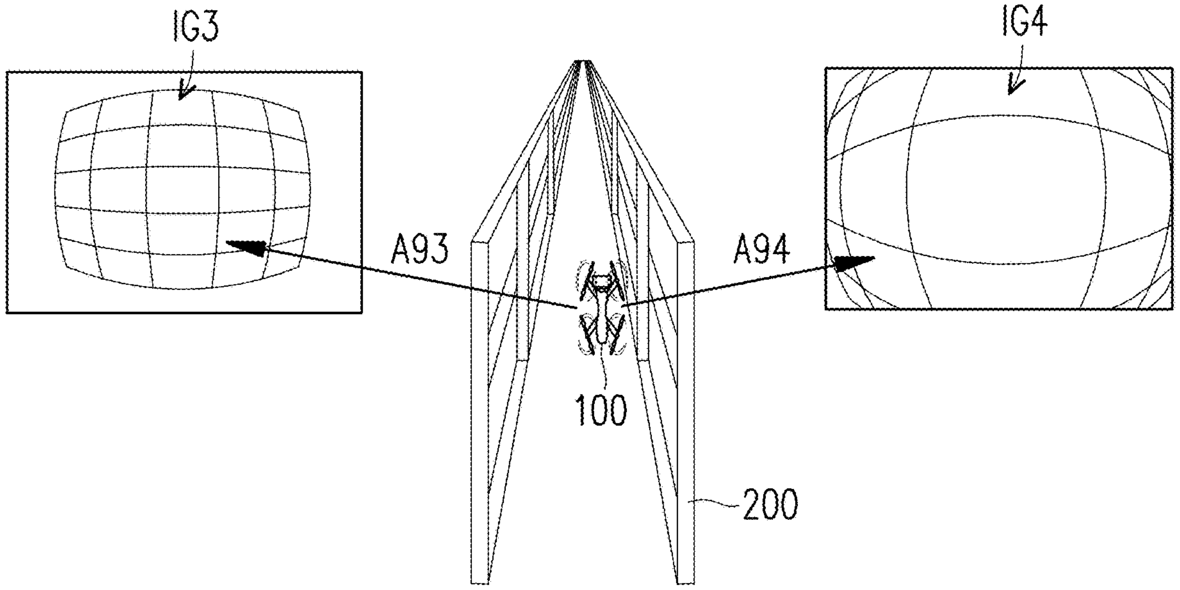
FIG. 9B is a schematic diagram of illustrating reference lines shown by the images captured by the drone when the drone is closer to the right reference object according to an embodiment of the present disclosure.
Figure 9C:
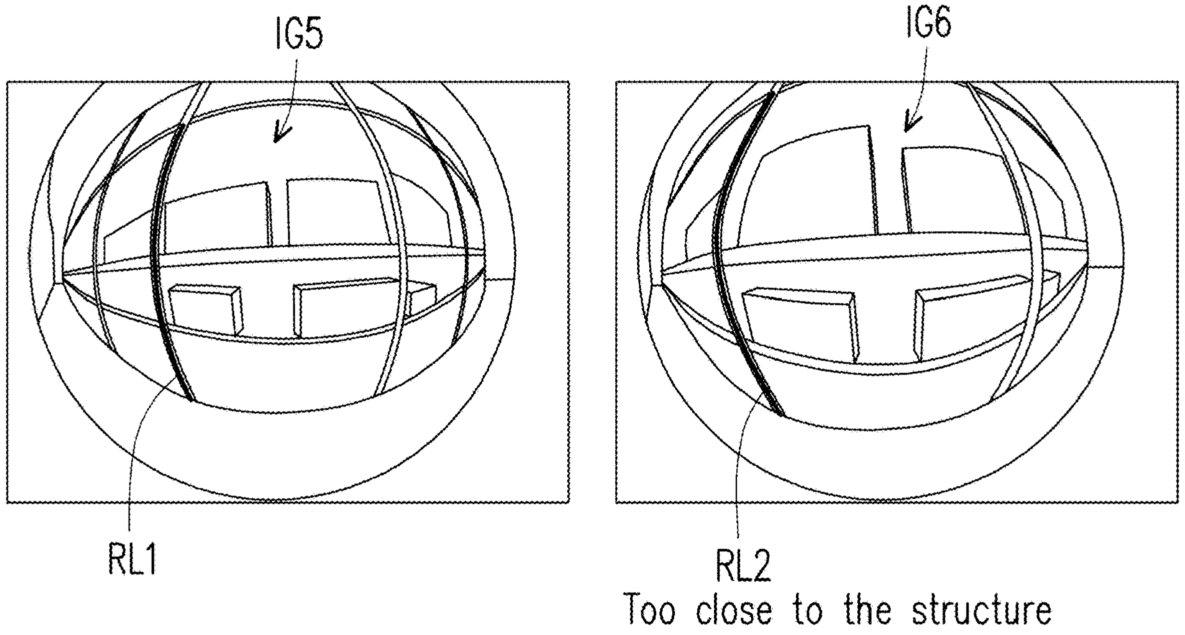
FIG. 9C is a schematic diagram of illustrating reference lines shown by the images captured by the drone when the drone is adjacent to the reference object by different distances according to an embodiment of the present disclosure.

FIG. 9C is a schematic diagram of illustrating reference lines shown by the images captured by the drone when the drone is adjacent to the reference object by different distances according to an embodiment of the present disclosure. FIG. 9C illustrates the practical application of the optical distortion-based navigation method, demonstrating how the curvature of reference lines is used to determine the drone's distance from the reference object. This figure shows two images, IG5 and IG6, captured by the drone's camera with high optical distortion properties at different distances from the reference object.

In image IG5, showing a reference line RL1 with a moderate curvature. This curvature indicates that the drone is at an appropriate distance from the reference object, allowing for optimal navigation and image capture.

Contrastingly, image IG6 shows a reference line RL2 with a significantly more pronounced curvature. The increased curvature in IG6 signifies that the drone is too close to the structure, as indicated by the caption "Too close to the structure" beneath the image.

The navigation system utilizes these curvatures to maintain an optimal distance from the reference object. Specifically, the method involves calculating the sum of absolute values of the curvatures for all visible reference lines in the captured image. This sum is then compared against predetermined thresholds to determine the necessary action.

When the sum of absolute values of the curvatures is greater than a first curvature summation threshold, as seen in image IG6, the system recognizes that the drone is too close to the reference object. In this case, the navigation method controls the drone to move away from the reference object along a third coordinate axis (typically the Z-axis in the three-dimensional space of the provided drone system).

Conversely, although not explicitly shown in FIG. 9C, when the sum of the absolute values of the curvatures is less than a second curvature summation threshold, indicating that the drone is too far from the reference object, the system would control the drone to move closer to the reference object along the third coordinate axis.

This adaptive positioning ensures that the drone maintains an optimal distance from the reference object, allowing for accurate navigation and effective task performance. The continuous monitoring and adjustment based on the curvature of reference lines enable the drone to navigate precisely in complex indoor environments, even as it moves along the length of the reference object or performs various tasks.

Figure 2:
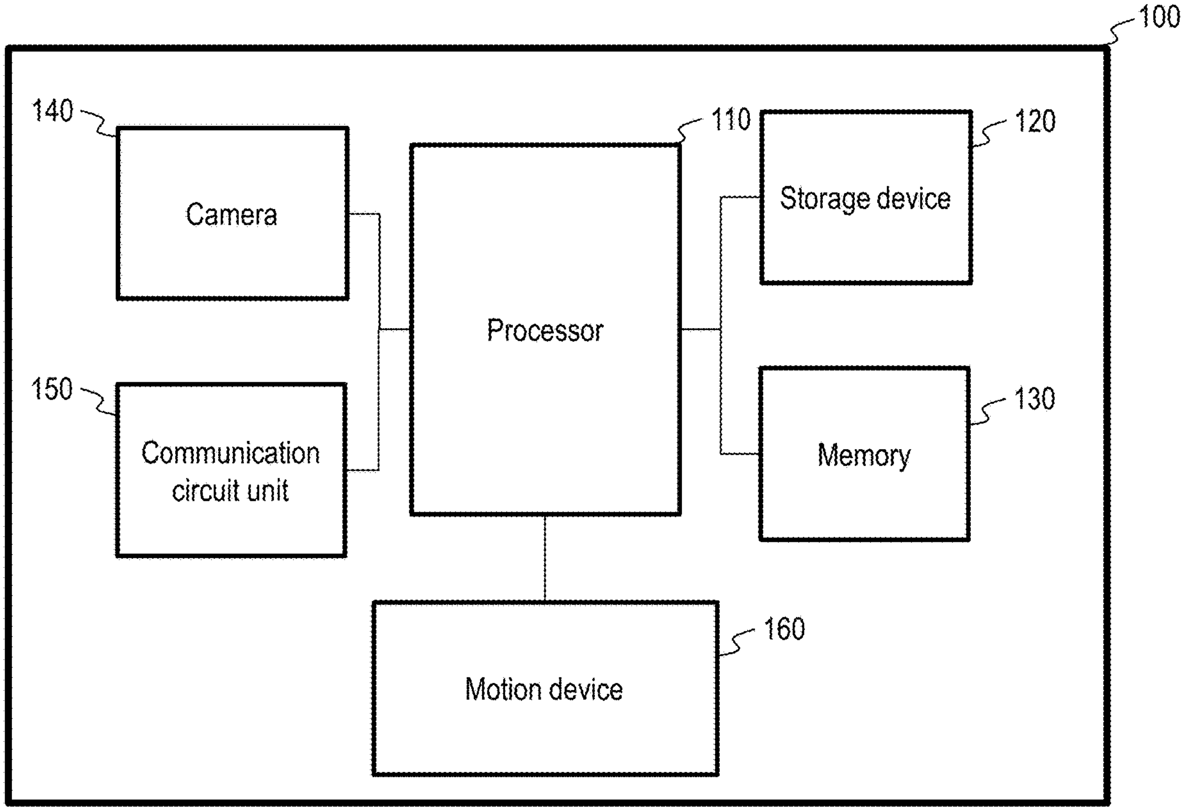
FIG. 2 is a block diagram of illustrating a drone according to an embodiment of the present disclosure.

FIG. 2 is a block diagram of illustrating a drone according to an embodiment of the present disclosure.

FIG. 2 illustrates a block diagram of a drone 100 according to the present disclosure. In an embodiment, the drone 100 includes several key components that work together to implement the optical distortion-based navigation method.

The drone 100 includes a processor 110, which serves as the central processing unit for executing the navigation algorithms and controlling other components. Electronically connected to the processor 110 is a storage device 120, which stores program modules necessary for implementing the navigation method. These program modules contain instructions that, when executed by the processor 110, enable the drone 100 to perform various functions such as image capture, distortion analysis, and navigation calculations, etc.

The processor 110 may be a central processing unit (CPU, Central Processing Unit) Graphics Processing Unit (GPU, Graphics Processing Unit) Digital Signal Processor (DSP, Digital Signal Processor) Application-Specific Integrated Circuit (ASIC, Application-Specific Integrated Circuit) Field-Programmable Logic Gate Array (FPGA, Field-Programmable Gate Array) or other computing unit suitable for performing the presently disclosed method.

The storage device 120 may be a hard disk drive, a solid state drive, flash memory, or other non-volatile storage media. The storage device 120 is used to store parameters, reference data related to the drone navigation system, program modules (program codes) and other data necessary to implement the presently disclosed methods. In addition, the storage device 120 may store software or firmware of the drone 100.

A memory 130 is also connected to the processor 110. This memory 130 is used for temporary storage of data utilized by the navigation method, including captured images, calculated curvatures, and intermediate navigation parameters.

The communication circuit unit 150 is responsible for establishing the network connection (also referred to as communication connection) NC, allowing the drone 100 to communicate with external devices or systems, such as the server 300 shown in FIG. 1A. This component enables the drone 100 to receive instructions, transmit data, or coordinate with other electronic device via the established communication connection.

The camera 140 is a crucial component of the drone's navigation system. It is equipped with a lens having high optical distortion properties, specifically designed to capture images with pronounced curvatures of reference lines. The camera 140 continuously captures images of the environment, particularly focusing on the reference object. These distorted images serve as the primary input for the navigation algorithm, allowing the drone 100 to determine its position and orientation relative to the reference object.

Figure 6A:
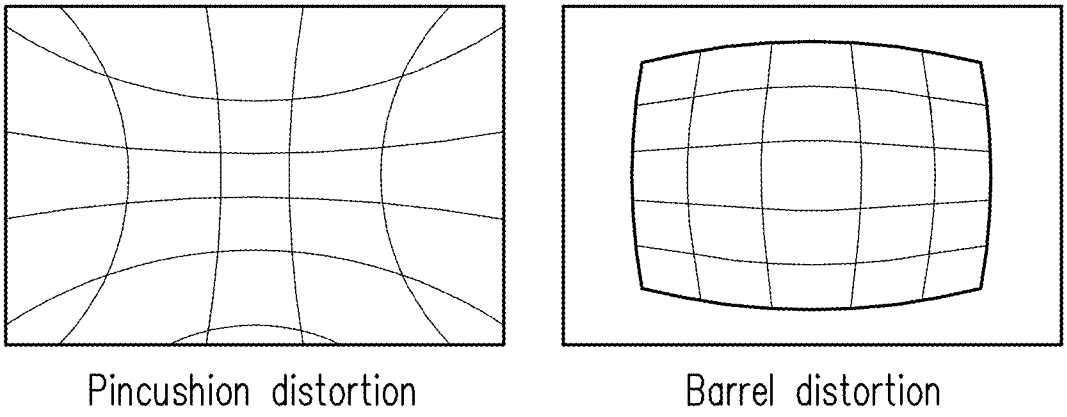
FIG. 6A is a schematic diagram of images captured by cameras having lens with different optical distortion properties types according to an embodiment of the present disclosure.

FIG. 6A is a schematic diagram of images captured by cameras having lens with different optical distortion properties types according to an embodiment of the present disclosure.

Referring to FIG. 6A, this figure showcases two common types of optical distortion: pincushion distortion and barrel distortion.

Pincushion distortion, shown on the left side of FIG. 6A, is characterized by lines that bow inwards towards the center of the image. In this type of distortion, the magnification increases with the distance from the optical axis. As a result, objects near the edges of the frame appear to be pulled towards the corners, creating a pincushion-like effect. The straight lines of a cell pattern, when viewed through a lens with pincushion distortion, appear to curve outward from the center.

Barrel distortion, depicted on the right side of FIG. 6A, presents the opposite effect. In this case, the lines bow outwards from the center of the image, resembling the shape of a barrel. With barrel distortion, the magnification decreases as the distance from the optical axis increases. Consequently, objects near the edges of the frame appear to be compressed inwards. A cell pattern viewed through a lens with barrel distortion will show curved lines that bend inward towards the center of the image.

For the purposes of the drone navigation method disclosed in the present disclosure, barrel distortion is typically preferred. The outward bowing of lines in barrel distortion provides more pronounced curvatures for the boundaries of the reference cell (e.g., the most center cell in the captured image), which can be advantageous for calculating the drone's position relative to the reference object.

The camera 140 in the drone 100 is equipped with a lens that produces significant barrel distortion. This choice of lens enables the navigation system to capture images where the reference lines of the environment (such as edges of shelving units or structural beams) exhibit clear and measurable curvatures. These curvatures are then analyzed by the processor 110 to determine the drone's position and guide its motions with high precision in indoor environments.

By leveraging these optical distortion properties, particularly barrel distortion, the drone's navigation system can effectively use the curvature of reference lines as a reliable metric for positioning and motion, without the need for external positioning systems or environmental modifications.

Back to FIG. 2, the motion device 160 is responsible for the drone's motion in three-dimensional space. It receives instructions from the processor 110 based on the navigation calculations. The motion device 160 can adjust the drone's position along three orthogonal axes, allowing it to move closer to or further from the reference object, as well as navigate along its length.

The motion device 160 typically includes the following key components:

(1) Propulsion System: one or more brushless DC (BDLC) motors, or other type of motor, each driving a propeller; Electronic Speed Controllers (ESCs) for each motor, allowing precise control of motor speed and direction; Propellers, typically made of durable and lightweight materials such as carbon fiber or reinforced plastic.

(2) Flight Control System: An Inertial Measurement Unit (IMU) containing accelerometers and gyroscopes to detect the drone's orientation and acceleration; A barometer for altitude measurement; Magnetometer (digital compass) for determining the drone's heading.

The motion device 160 works in conjunction with the processor 110, which sends control signals based on the navigation algorithms. These signals adjust the speed of individual motors, allowing the drone 100 to move forward, backward, left, right, up, down, rotate around its vertical axis (yaw) or to perform multi-directional motion fusion.

For example, to move closer to a reference object 200, the processor 110 might instruct the motion device 160 to increase the speed of the rear motors while slightly decreasing the speed of the front motors. This action would tilt the drone forward, resulting in forward motion. Similarly, to adjust its height, the processor 110 could command the motion device 160 to increase or decrease the speed of all motors simultaneously.

Figure 3:
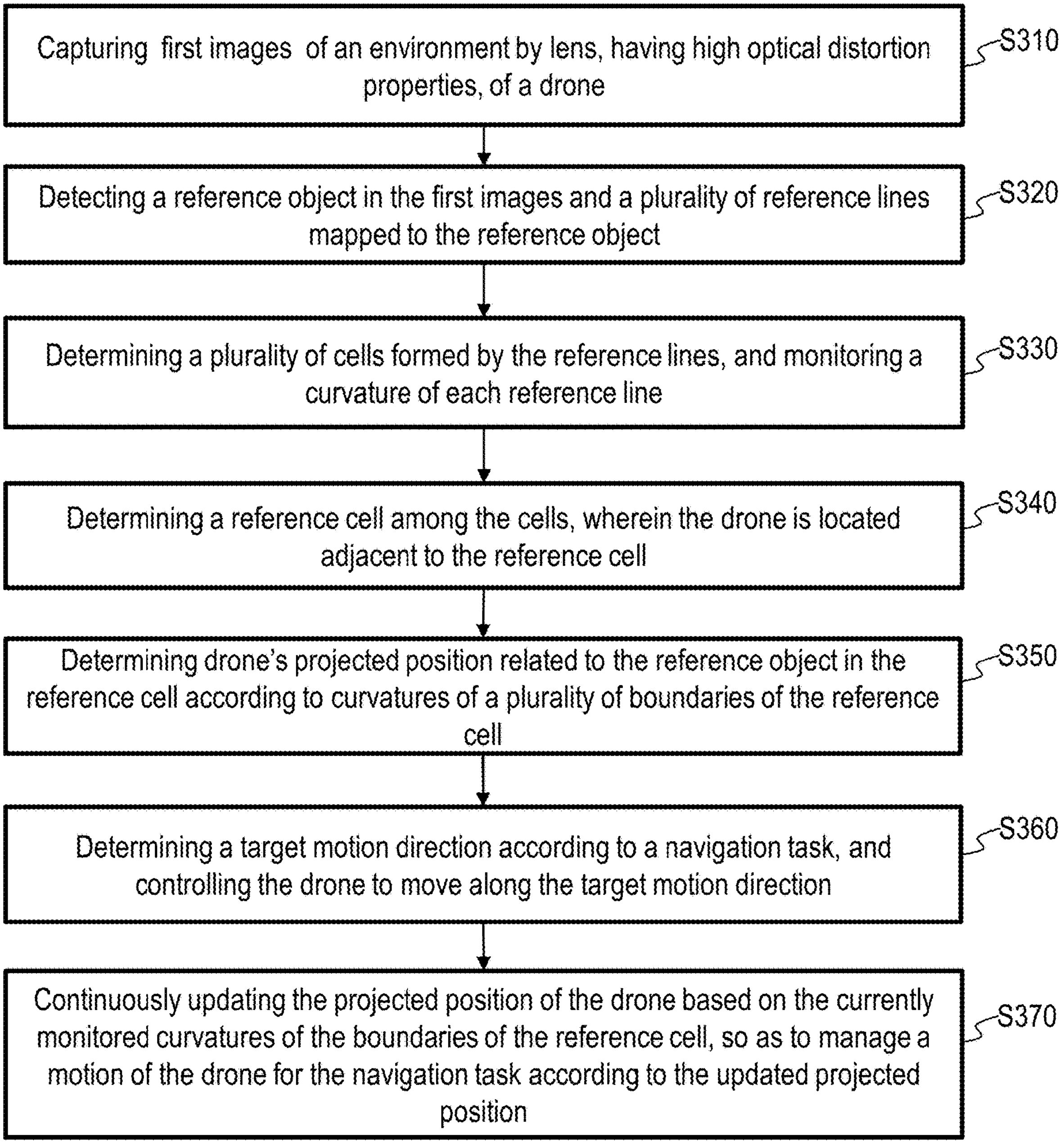
FIG. 3 is a flowchart of illustrating a drone navigation method according to an embodiment of the present disclosure.

FIG. 3 is a flowchart of illustrating a drone navigation method according to an embodiment of the present disclosure.

Referring to FIG. 3, in step S310, where the drone 100 captures first images of the environment using a camera 140 equipped with a lens having high optical distortion properties.

In step S320, the method involves determining a reference object 200 in the first images and a plurality of reference lines mapped to the reference object 200. These reference lines are set to correspond to structural elements of the reference object 200, such as edges or the central line of shelving units or beams.

Figure 4A:
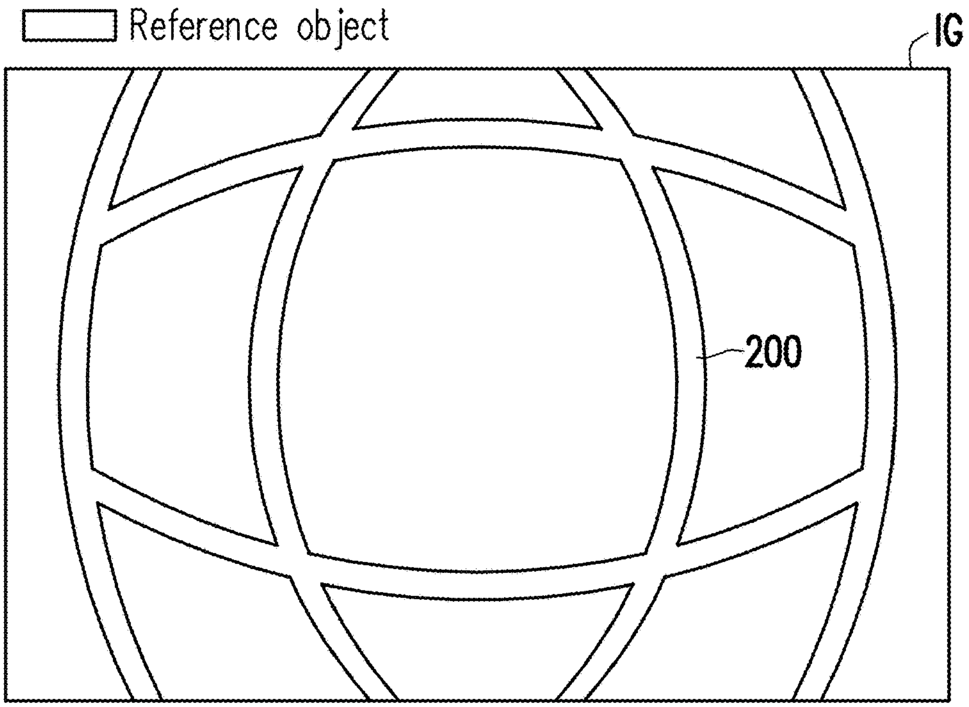
FIG. 4A is a schematic diagram of illustrating reference object shown in an image captured by the drone's camera having lens with high optical distortion properties according to an embodiment of the present disclosure.
Figure 4B:
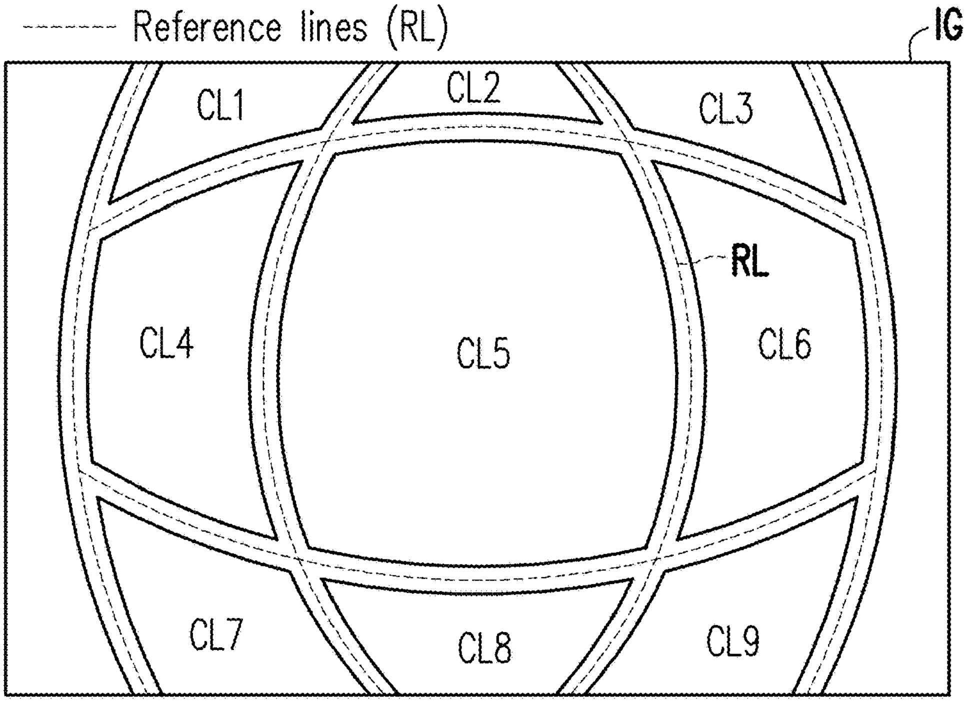
FIG. 4B is a schematic diagram of illustrating reference lines mapped to the reference object shown in an image captured by the drone's camera having lens with high optical distortion properties according to an embodiment of the present disclosure.

FIG. 4A is a schematic diagram of illustrating reference object shown in an image captured by the drone's camera having lens with high optical distortion properties according to an embodiment of the present disclosure. FIG. 4B is a schematic diagram of illustrating reference lines mapped to the reference object shown in an image captured by the drone's camera having lens with high optical distortion properties according to an embodiment of the present disclosure.

Referring to FIG. 4A, FIG. 4A shows an image IG of a reference object 200 as captured by the drone's camera 140. The reference object 200 appears distorted due to the barrel distortion effect of the camera lens, resulting in curved lines and a bulging effect away the center of the image.

To accurately detect the reference object 200 and map reference lines to it, the method employs several steps:

(1) Emitting a specific light: The drone emits a specific light, typically in the infrared spectrum (or other visible light), towards the reference object 200. This light is chosen for its ability to highlight structural elements effectively.

(2) Capturing second images: The drone's camera 140 (or other specific camera corresponding to the emitted light) captures second images of the reference object 200 illuminated by this specific light. These images enhance the visibility of the structural outline of the reference object.

(3) Distinguishing structural outline: The method processes these second images to distinguish the structural outline of the reference object 200. This is possible because the surfaces of the reference object 200 (typically metallic shelving units or beams) have higher reflection coefficients for the specific light compared to other objects in the environment (such as stored items or packaging materials).

(4) Virtually setting reference lines: As shown in FIG. 4B, the method virtually sets a plurality of reference lines RL on the structural outline of the reference object 200. These reference lines RL, represented by dashed lines, are mapped to reflect the actual structural outline of the reference object 200.

Referring to FIG. 4B, the reference lines RL form a cell structure that divides the reference object 200 into multiple cells, labeled as CL1 to CL9 in FIG. 4B. These cells serve as the basis for the drone's navigation system.

The virtually set reference lines RL account for the optical distortion of the camera lens. As seen in FIG. 4B, the reference lines RL appear curved, mirroring the distortion effect of the lens. This curvature is used by the navigation method, as it provides the necessary information to calculate the drone's position relative to the reference object 200.

By analyzing the curvature of these reference lines RL, particularly at the boundaries of each cell (CL1-CL9), the drone can determine its projected position regarding the cells of the reference object. The degree of curvature in different areas of the image provides spatial information, allowing the drone 100 to understand its distance and orientation relative to the reference object 200.

This method of virtually mapping reference lines to a distorted image of the reference object enables the drone 100 to navigate precisely in indoor environments without relying on external positioning systems. It leverages the optical distortion, typically considered a drawback, as a tool for accurate spatial awareness and navigation.

Back to FIG. 3, in step S330, this step focuses on determining a plurality of (virtual) cells formed by the reference lines and monitoring the curvature of each reference line. The cells corresponding to the reference object 200 serve as a framework for the drone's navigation, while the curvatures provide essential spatial information.

The method proceeds to step S340, where a reference cell among the determined cells is selected. This reference cell is typically the one adjacent to which the drone is currently located (e.g., the reference cell is the cell closest to the drone). In an embodiment, the reference cell is typically the one (e.g., the cell CL5 in FIG. 4B) located in the center area of the captured image.

In step S350, the drone's projected position related to the reference cell of the reference object 200 is determined. This determination is based on the curvatures of a plurality of boundaries of the reference cell, allowing for precise positioning relative to the environment, especially, related to the center of the reference cell in the view along the Z-axis direction.

Figure 5:
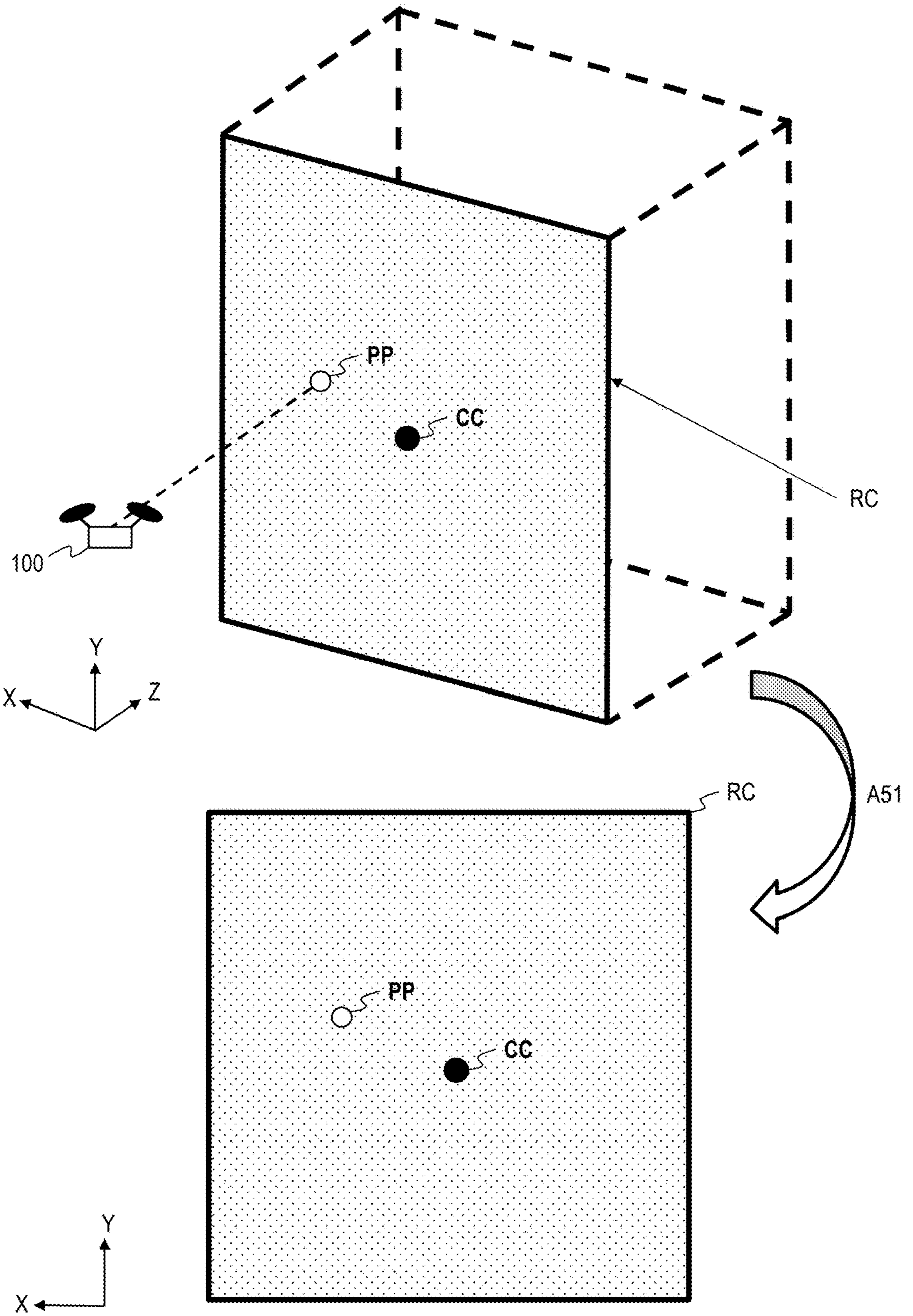
FIG. 5 is a schematic diagram of illustrating drone's projected position to a reference cell and a cell center of the reference cell according to an embodiment of the present disclosure.

FIG. 5 is a schematic diagram of illustrating drone's projected position to a reference cell and a cell center of the reference cell according to an embodiment of the present disclosure.

FIG. 5 illustrates the concept of the drone's projected position relative to a reference cell and its cell center, as described in step S350 of the navigation method. This figure provides both a three-dimensional perspective and a two-dimensional side view to clearly demonstrate the spatial relationships involved.

The upper part of FIG. 5 shows a three-dimensional representation of a reference cell RC, which is corresponding to a part of the reference object. The drone 100 is positioned in front of this reference cell RC, with its camera capturing images of the cell. The coordinate system (X, Y, Z) is provided to indicate the spatial orientation.

The reference cell RC is represented as a dotted plane, signifying that it is a virtual construct derived from the captured and processed images. Within this reference cell RC, two key points are determined:

(1) Cell Center (CC): This point, marked as a solid black dot, represents the center of the reference cell RC.

(2) Projected Position (PP): This point, marked as a hollow white dot, represents the drone's projected position onto the plane of the reference cell RC along the Z-axis.

The lower part of FIG. 5, indicated by the annotation A51, shows a two-dimensional side view of the same reference cell RC. This view clearly illustrates the relative positions of the cell center CC and the projected position PP within the X-Y plane of the reference cell.

The projected position PP is determined based on the curvatures of the boundaries of the reference cell RC, as captured in the drone's distorted images. By analyzing these curvatures, the navigation system calculates where the drone's position would project onto the plane of the reference cell.

The vector from CC to PP provides information about the drone's X-Y position relative to the center CC of the reference cell RC (in the X and Y dimensions).

This information allows the drone to understand its X-Y position within the reference cell in three-dimensional space relative to the reference object. The navigation system uses this projected position to make decisions about motion/direction and to maintain the desired position relative to the reference object.

For example, if the projected position PP is not at the cell center CC, the drone may need to adjust its position to center itself relative to the current reference cell. Alternatively, if a navigation task requires the drone to move to an adjacent cell, the system would use this projected position as a starting point to calculate the necessary motion vector.

By continuously updating this projected position based on real-time image analysis, the drone 100 can navigate precisely within the environment, maintaining awareness of its location relative to X-Y plane corresponding to the reference object at all times.

The coordinate system described in the embodiments is exemplary and not limiting. The invention can be implemented using different coordinate system arrangements as long as they maintain the fundamental principles of the navigation method. For instance, while the embodiments describe the reference cell plane as lying in the XY plane with the approach direction along the Z-axis, alternative arrangements are possible. One such alternative could define the reference cell plane in the XZ plane, with the approach direction along the Y-axis. In this case, the projected position of the drone would be mapped onto the XZ plane, and the distance between the drone and the reference object would be measured along the Y-axis. Such coordinate system variations do not affect the essential features of the invention, including: (1) The ability to determine the drone's projected position relative to the reference grid; (2) The use of optical distortion for navigation and positioning; (3) The calculation of curvatures for boundary detection; (4) The motion control based on the monitored curvatures. The key aspects of the invention remain valid regardless of how the coordinate system is defined, as long as the system maintains, such as: (1) A plane for defining the reference cell structure; (2) An axis perpendicular to this plane for approach distance; (3) Consistent relationship between the coordinate system and curvature calculations.

Figure 6B:
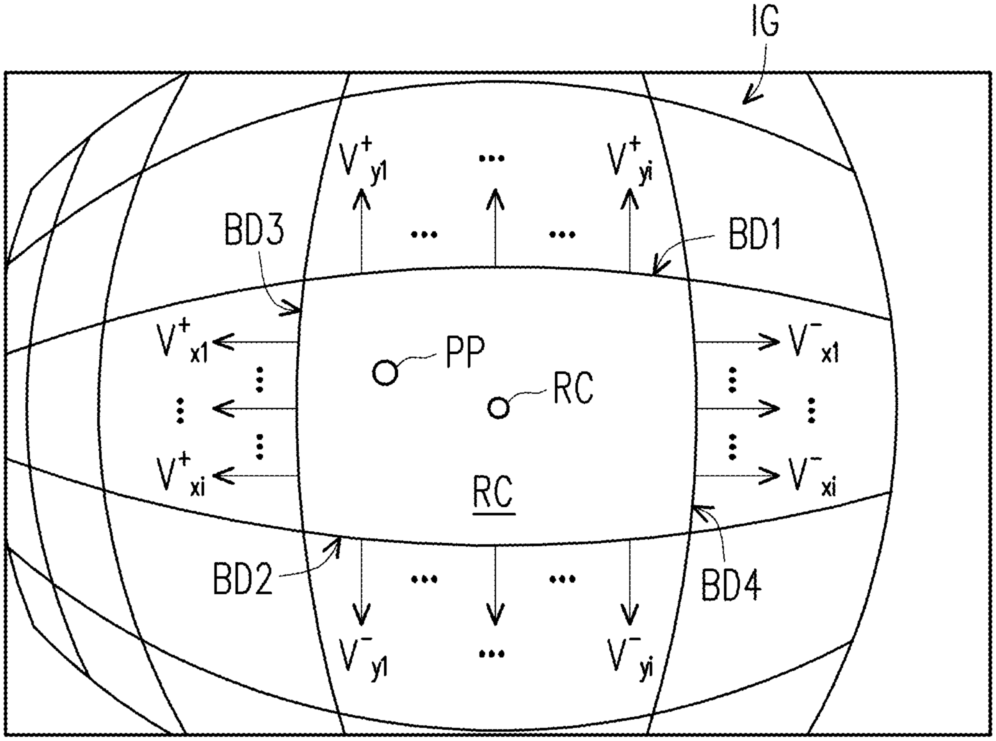
FIG. 6B is a schematic diagram of illustrating multiple direction vectors corresponding to curvatures of multiple boundaries of a reference cell according to an embodiment of the present disclosure.

FIG. 6B is a schematic diagram of illustrating multiple direction vectors corresponding to curvatures of multiple boundaries of a reference cell according to an embodiment of the present disclosure.

In an embodiment, FIG. 6B illustrates a schematic diagram of multiple direction vectors corresponding to curvatures of multiple boundaries of a reference cell according to the present disclosure. This figure demonstrates the method for determining the drone's projected position within a reference cell based on the optical distortion of captured images.

The image IG shows a distorted reference cell RC as captured by the drone's camera with high optical distortion properties. The reference cell RC is surrounded by four boundaries: BD1 (top), BD2 (bottom), BD3 (left), BD4 (right).

The method for determining the drone's projected position PP involves several steps:

(1) Determining curvatures: processor 110 determines the curvature of each boundary (BD1, BD2, BD3, BD4) of the reference cell RC.

(2) Calculating direction vectors: Based on the curvatures of the boundaries, the processor 110 calculates corresponding direction vectors. These vectors are represented in FIG. 6B as:

Vectors $V^{+}_{y1}$ to $V^{+}_{yi}$ for the upper boundary BD1;
Vectors $V^{-}_{y1}$ to $V^{-}_{yi}$ for the lower boundary BD2;
Vectors $V^{+}_{x1}$ to $V^{+}_{xi}$ for the left boundary BD3;
Vectors $V^{-}_{x1}$ to $V^{-}_{xi}$ for the right boundary BD4.

Furthermore, each direction vector comprises two components: (a). A first vector value corresponding to the X-axis (horizontal); and (b). A second vector value corresponding to the Y-axis (vertical).

The magnitude and direction of these vectors are determined by the degree of curvature in their respective boundaries. For example, a more pronounced curvature in the upper boundary BD1 would result in larger $V^{+}_{y}$ vectors, indicating that the drone is closer to the top of the reference cell RC. This example demonstrates that as the curvature of the upper boundary increases: (a) the X-component of the vector $V^{+}_{y}$ emerges and grows significantly; (b) the Y-component of the vector $V^{+}_{y}$ also increases, but less dramatically; (c) the overall magnitude of the vector $V^{+}_{y}$ increases substantially due to contributions from both components.

(3) Summing the vectors: The system calculates the sum of all direction vectors. This sum provides a composite vector that points from the cell center CC to the drone's projected position PP.

(4) Determining the projected position: The final projected position PP of the drone is determined based on this sum of all direction vectors. Importantly, if the sum of all direction vectors is zero, it indicates that the drone's projected position PP coincides with the cell center CC.

This method allows the drone 100 to precisely locate its position relative to the reference cell RC. By continuously updating these calculations based on real-time image captures, the drone 100 can maintain accurate positional awareness and make necessary adjustments to its flight path or position.

This vector-based approach to position determination demonstrates the innovative use of optical distortion as a navigation tool, enabling precise indoor navigation without relying on traditional positioning systems like GPS. The continuous monitoring and calculation of these vectors allow the drone to navigate effectively within the structured environment, maintaining its position or moving to new locations as required by its navigation tasks.

It should be mentioned that, in an embodiment, the processor 110 employs a method to determine the distance between the drone 100 and the reference cell plane of the reference object 200. This method integrates the lens specifications, the observed curvatures of the reference cell boundaries, and the known actual dimensions of the cell.

The process involves the following steps:

(1) Lens Calibration: The system stores detailed specifications of the drone's camera lens, including its focal length, field of view, and distortion parameters. These are typically obtained through a pre-flight calibration process.

(2) Image Capture and Analysis: As the drone 100 navigates, it continuously captures images of the reference object 200. The processor 110 analyzes these images, determining the boundaries of the reference cell and calculating their curvatures in the image plane.

(3) Curvature Quantification: The system quantifies the curvature of each boundary (left, right, top, and bottom) of the reference cell. For instance, it might use a polynomial fitting method to describe the curve and extract its maximum deviation from a straight line.

(4) Real-world Dimension Mapping: The processor 110 accesses stored information about the actual dimensions of each cell in the reference object 200. This could be, for example, the known width and height of a standard shelf unit in a warehouse.

(5) Distance Calculation: Using a predefined mathematical model that relates lens distortion to object distance, the processor 110 calculates the distance. This model takes into account: (a) the lens distortion parameters; (b) the observed curvature of the cell boundaries; (c) the actual dimensions of the cell.

For example, the calculation might use a formula like: Distance=f(lens_params, observed_curvature, actual_dimensions) Where f is a function derived from the lens's distortion characteristics.

(6) Continuous Updating: As the drone moves, this distance calculation is performed continuously, allowing for real-time distance tracking.

This method offers several advantages:

It provides accurate distance measurements without the need for additional sensors like ultrasonic or laser rangefinders.

The distance calculation is integrated seamlessly with the navigation system, using the same visual data.

It allows for continuous distance monitoring, crucial for maintaining safe and precise positioning in complex indoor environments.

The method is scalable and can be applied to various sizes of reference objects or cells, making it versatile for different industrial settings.

Figure 6C:
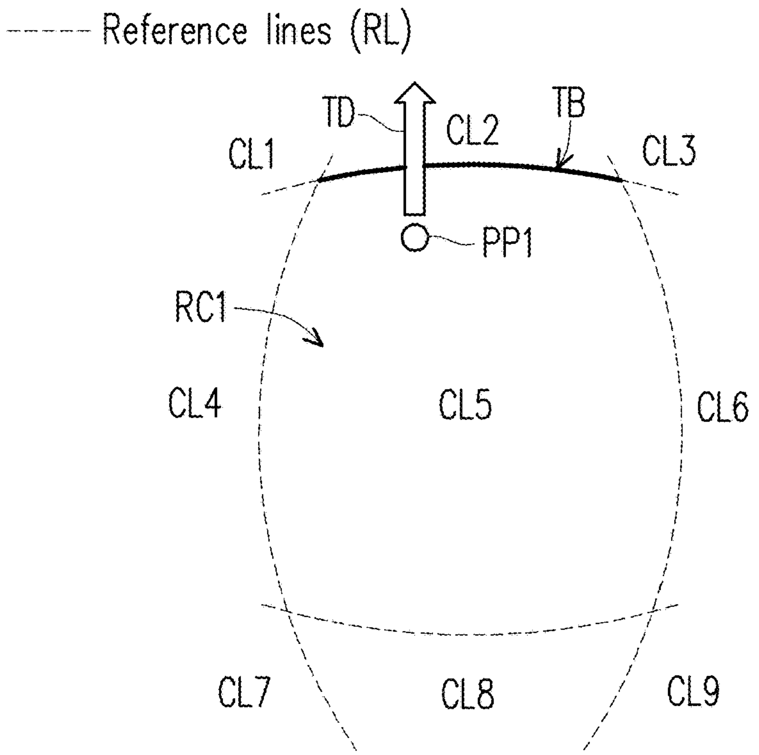
FIG. 6C is a schematic diagram of illustrating a curvature of a target boundary of a reference cell in the captured image and drone's projected position moves along a target direction before crossing the target boundary according to an embodiment of the present disclosure.
Figure 6D:
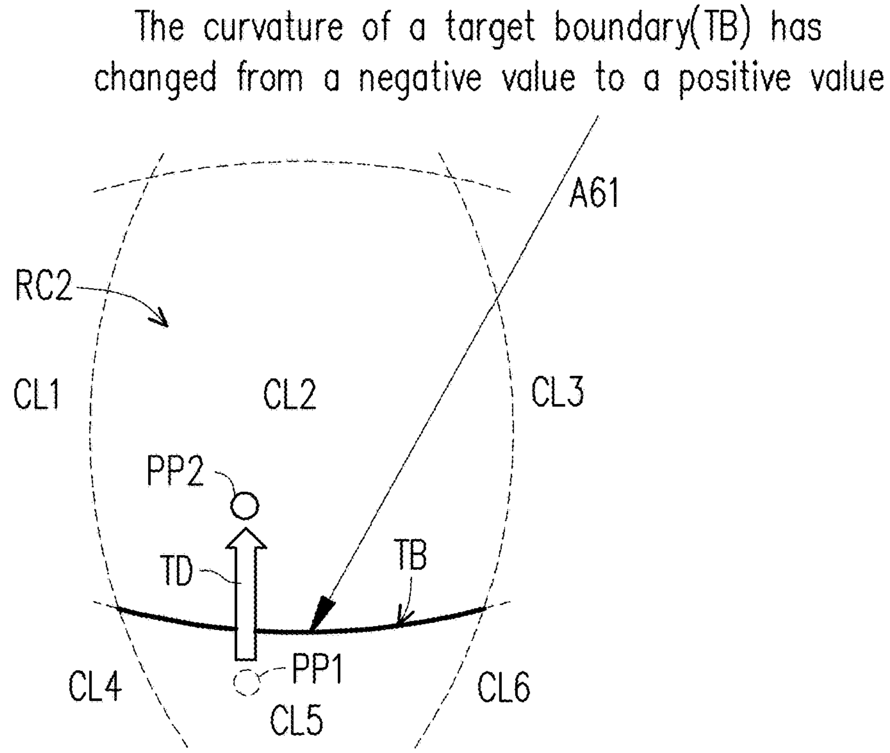
FIG. 6D is a schematic diagram of illustrating a curvature of a target boundary of a reference cell in the captured image and drone's projected position moves along a target direction after crossing the target boundary according to an embodiment of the present disclosure.

FIG. 6C is a schematic diagram of illustrating a curvature of a target boundary of a reference cell in the captured image and drone's projected position moves along a target direction before crossing the target boundary according to an embodiment of the present disclosure. FIG. 6D is a schematic diagram of illustrating a curvature of a target boundary of a reference cell in the captured image and drone's projected position moves along a target direction after crossing the target boundary according to an embodiment of the present disclosure.

FIG. 6C and FIG. 6D illustrate the process of determining whether the drone's projected position has crossed a target boundary of a reference cell, based on changes in the curvature of that boundary. This method is provided for maintaining accurate navigation as the drone moves between adjacent cells.

In FIG. 6C, assuming that the drone's initial position PP1 is within the reference cell RC1. Specifically, the reference cell RC1 is cell CL5 among nine cells (CL1 to CL9), with the drone's projected position PP1 located in cell CL5. The target boundary TB is shown as the upper boundary of CL5, separating it from a neighboring cell CL2 corresponding to the target boundary TB. At this stage, the curvature of the target boundary TB has a positive value, indicating that the projected position of the drone is still within the current reference cell RC1. The target boundary is a boundary about to be crossed if the drone kept the motion along the target direction TD.

The method for determining the crossing of the target boundary involves the following steps:

(1) Monitoring changes of curvatures: The processor 110 continuously monitors the curvatures of all boundaries of the reference cell RC1. In an embodiment, the processor especially monitors the curvature of the target boundary TB which is in front of projected position PP1 when the PP1 moves along the target direction TD.

(2) Determining boundary crossing: As the drone moves along the target direction TD (indicated by the upward arrow), the system observes changes in the curvature of the target boundary TB.

FIG. 6D shows the situation after the drone has moved along the target direction TD. The key observation here is that the curvature of the target boundary TB has changed from a negative value to a positive value. This change in sign is the crucial indicator that the drone's projected position has crossed the target boundary TB.

(3) Updating reference cell: Upon detecting this change in curvature sign, the processor 110 determines that the projected position (e.g., PP2) of the drone 100 has crossed the target boundary TB and entered the neighboring cell CL2. Consequently, the processor 110 updates the current reference cell (RC2) from CL5 to CL2, as shown in FIG. 6D.

(4) Re-determining projected position: After updating the reference cell, the system re-calculates the drone's projected position. In FIG. 6D, the new projected position PP2 within the updated reference cell RC2 has been determined. In an embodiment, the processor further updates the cell coordinate of the current reference cell, such that the current projected position of the drone 100 among the cells of the reference object can be well managed for the current navigation task.

Conversely, for a camera lens with pincushion distortion, the process is similar but with reversed signs:

(1) The system monitors boundary curvatures as before.

(2) In this case, it looks for a change from a negative value to a positive value to indicate boundary crossing.

For instance, with the same upward motion: the upper boundary initially has a positive curvature (curving upward); as the drone crosses this boundary, the curvature changes to negative (now curving downward from the new perspective); this change from positive to negative signifies the drone has entered the upper cell.

In summary, the foregoing process allows the drone 100 to seamlessly transition its navigation framework from one cell to another, maintaining continuous and accurate positional awareness. By utilizing the change in curvature sign of the target boundary, the system can precisely determine when the drone has moved from one cell to another, even in the absence of traditional positioning systems.

Back to FIG. 3, Step S360 involves determining a target motion direction according to a specific navigation task. Once the direction is established, the drone is controlled to move along this target motion direction.

Finally, step S370 encompasses the continuous updating of the drone's projected position. This ongoing process is based on the currently monitored curvatures of the boundaries of the reference cell. By constantly reassessing its position, the drone 100 can manage its motion for the navigation task according to the updated projected position, ensuring accurate and adaptive navigation throughout the operation.

Figure 7A:
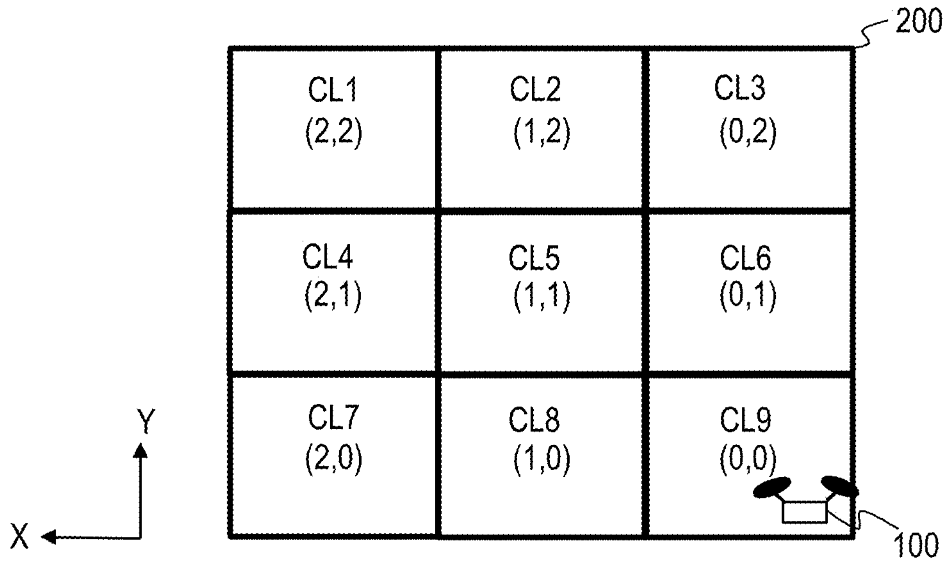
FIG. 7A is a schematic diagram of illustrating cells of a reference object and a drone according to an embodiment of the present disclosure.

FIG. 7A is a schematic diagram of illustrating cells of a reference object and a drone according to an embodiment of the present disclosure. This figure demonstrates the assignment of cell coordinates to facilitate precise navigation within the structured environment.

Referring to FIG. 7A, for example, assuming that the reference object 200 is virtually divided into a 3×3 cell structure via the reference lines thereof, with each cell labeled from CL1 to CL9. This cell structure represents the overall structural information of the reference object 200, which could be a shelving unit or a section of a warehouse wall.

To implement the navigation method, the system performs the following steps:

(1) Obtaining structural information: The system first obtains the overall structural information of the reference object 200. This includes calculating the relative distances between each cell center and the length of each boundary for all cells. This information is used for accurate navigation and positioning.

(2) Assigning cell coordinates: As shown in FIG. 7A, each cell is assigned a unique set of cell coordinates. The coordinate system is set up with the origin (0,0) at the bottom-right corner (CL9), with the X-axis increasing towards the left and the Y-axis increasing upwards. The cell coordinates for each cell are as follows: CL1: (2,2); CL2: (1,2); CL3: (0,2); CL4: (2,1); CL5: (1,1); CL6: (0,1); CL7: (2,0); CL8: (1,0); CL9: (0,0).

This coordinate system allows the drone 100 to precisely locate its cell position relative to the reference object 200. For example, if the drone knows its position corresponds to the coordinates (0,0) in the reference object's coordinate system 100, it determines that it is in cell CL9. And, the destination cell or a waypoint cell can be set by assigning corresponding cell coordinates in the navigation task.

Specifically, the assignment of cell coordinates serves several important purposes:

(1) Navigation planning: It enables the drone to plan efficient paths when moving from one cell to another. For instance, moving from CL9 to CL1 would involve a change of (+2,+2) in the coordinate system.

(2) Position reporting: The drone can report its position in terms of these cell coordinates, providing a standardized way of communicating location within the structured environment.

(3) Task allocation: In more complex systems with multiple drones, tasks can be assigned based on cell coordinates, ensuring efficient coverage of the entire reference object.

(4) Boundary detection: As the drone moves between cells, the change in coordinates helps confirm when it has crossed from one cell to another, complementing the curvature-based boundary detection method.

It should be mentioned that the overall structural information of the reference object 200 can be sent from the server 300 or be generated via a scanning structure task of the navigation task.

Figure 7B:
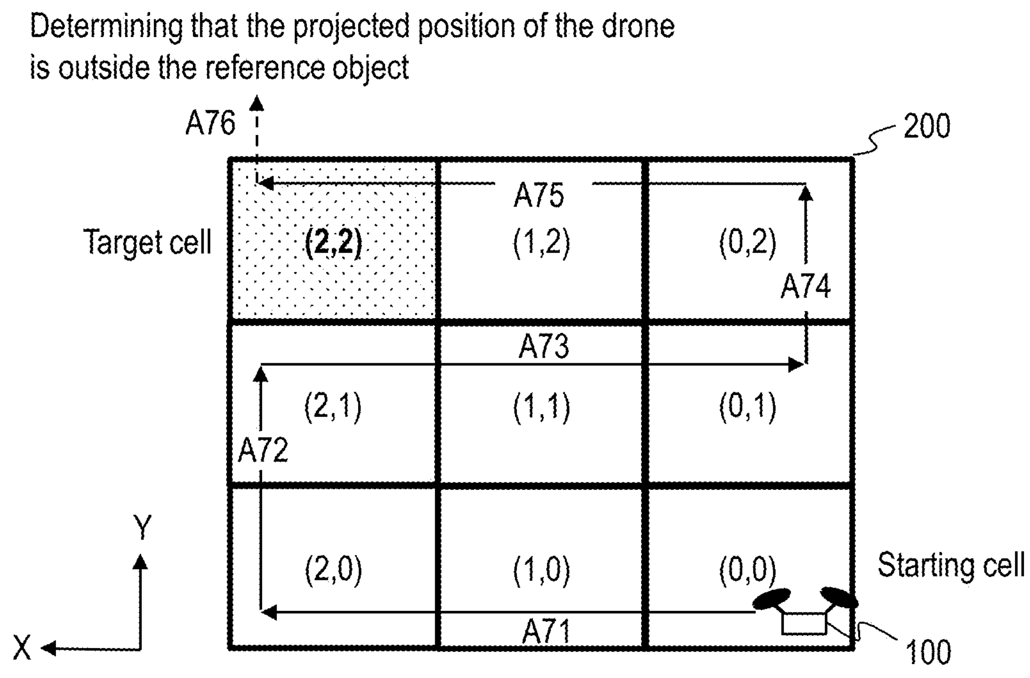
FIG. 7B is a schematic diagram of illustrating a drone moves based on a scanning structure task of a navigation task related to a reference object according to an embodiment of the present disclosure.

FIG. 7B is a schematic diagram of illustrating a drone moves based on a scanning structure task of a navigation task related to a reference object according to an embodiment of the present disclosure. This figure demonstrates the systematic motion pattern of the drone 100 as it scans the entire structure of the reference object 200.

The scanning structure task is executed as follows:

(a) Determining starting point: The drone 100 determines the starting cell, which in this case is the bottom-right cell with coordinates (0,0). This preset cell is designated as the starting cell and the initial target row.

(b) Horizontal scanning: The drone 100 begins scanning horizontally along the target direction (as illustrated by arrow A71). It moves from the starting cell (0,0) towards (2,0), scanning the entire bottom row.

(c) Vertical motion: Upon reaching the end cell of the first row (2,0), the drone 100 moves vertically upward (as illustrated by arrow A72) to the adjacent row.

(d) Updating target row and direction: The adjacent row becomes the new target row. The target direction is reversed (as illustrated by arrow A73), now moving from left to right.

(e) Continued scanning: The drone 100 scans the new target row horizontally along A73, moving from (2,1) to (0,1).

(f) Repeating the process: Steps (c)-(e) are repeated until the drone determines that the projected position is outside the whole reference object 200. For example, the drone 100 moves vertically again (as illustrated by arrow A74), then scans horizontally (as illustrated by arrow A75) along from (0,2) to (2,2).

(g) Final vertical motion: After scanning the last row, the drone 100 moves vertically (as illustrated by arrow A76), and the processor may determine that the projected position is outside the reference object since the new projected position is not in any cell.

Throughout this process, the current reference cell is continuously updated as the drone 100 moves from one cell to another. The system uses the optical distortion-based navigation method to accurately track the drone's position within each cell and detect transitions between cells.

The scanning structure task allows for comprehensive coverage of the entire reference object 200. This is particularly useful for applications such as inventory management, where the drone 100 might be equipped with sensors or cameras to inspect or count items in each cell.

It's important to note that while the drone 100 is scanning, it's also constantly monitoring its position relative to the reference object 200. The "Determining that the projected position of the drone is outside the reference object" note at the top of the figure suggests that the system is capable of recognizing when the drone has moved beyond the boundaries of the reference object 200. This feature ensures that the drone 100 stays within its designated operational area and can adjust its path or returns to the starting cell if it detects that it's moving out of bounds.

After completing the scan of all rows, the drone 100 would typically return to the starting cell (0,0), completing the scanning structure task. This systematic approach ensures thorough coverage of the reference object 200 while maintaining precise navigation throughout the task.

In this embodiment, the processor 110 may determine if the drone has exceeded the boundaries of the reference object based on the projected position and the existence of reference cells.

For example, after completing the scan of the last row, the drone 100 moves vertically as indicated by arrow A76. During this process, the system continuously monitors the drone's projected position relative to the reference object 200. The method for determining whether the drone has exceeded the reference object is as follows:

(1) Cell Identification: The system attempts to map the drone's projected position to a known cell within the reference object 200.

(2) Cell Non-existence: If the system fails to map the projected position to any known cell, this may indicate that the drone has moved beyond the bounds of reference object 200.

(3) Coordinate System Check: The system verifies whether the coordinates of the projected position exceed the defined cell coordinate range. For instance, if the coordinates become (3,2) or (−1,3), this clearly surpasses the valid range of (0,0) to (2,2) shown in the figure.

(4) Boundary Curvature Analysis: The system analyzes the curvature of reference lines in the captured image. If certain boundaries that should be visible suddenly disappear or if there's a significant change in curvature, this may indicate that the drone has moved beyond the reference object's range.

(5) Image Feature Recognition: If the captured image fails to detect the expected cell structure or reference lines, the system may determine that the drone has likely flown away from the reference object.

When the system determines through these methods that the drone's projected position is not within any known cell, it concludes that the drone has exceeded the boundaries of reference object 200. In this scenario, the system may trigger safety protocols, such as halting the ascent, hovering at the current position, or initiating a return to the starting cell.

Figure 8A:
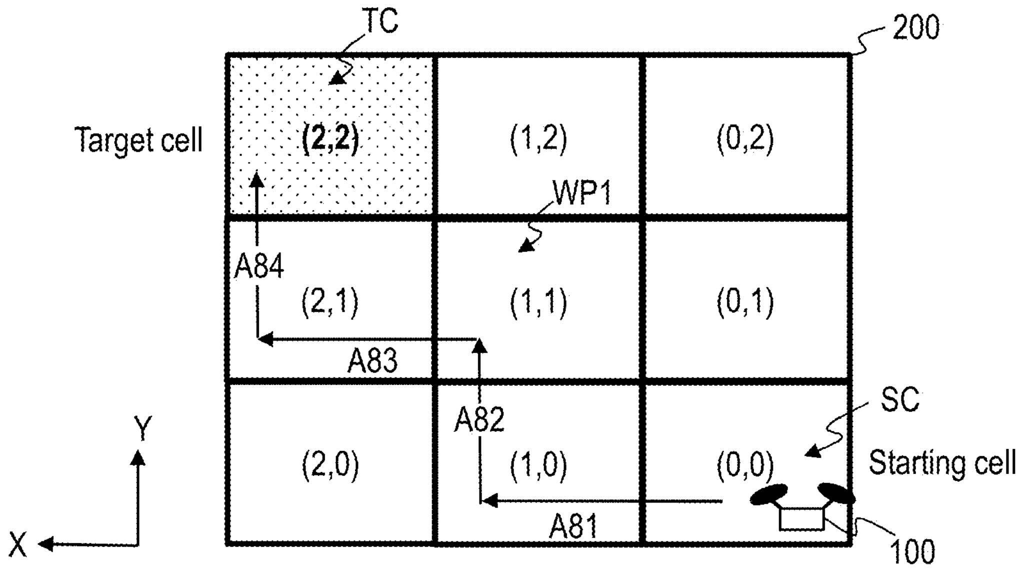
FIG. 8A is a schematic diagram of illustrating a drone moves based on a destination task of a navigation task related to a reference object according to an embodiment of the present disclosure.

FIG. 8A is a schematic diagram of illustrating a drone moves based on a destination task of a navigation task related to a reference object according to an embodiment of the present disclosure. In an embodiment, FIG. 8A illustrates a schematic diagram of a drone 100 executing a destination task as part of a navigation task related to a reference object 200. This figure demonstrates how the drone 100 navigates from a starting cell SC to a target cell TC within the structured environment of the reference object 200.

The destination task is executed as follows:

(1) Determining cell coordinates: The system determines the reference cell coordinates of the starting cell SC (0,0) and the target cell coordinates of the target cell TC (2,2).

(2) Determining motion direction by considering a waypoint cell: Based on the current position (cell coordinates of the starting cell), a waypoint (optional) and the target cell, the system continuously determines the target motion direction. In this case, the overall motion is from (0,0) to (1,1) and then to (2,2). The system may use intermediate waypoints, such as WP1 at (1,1), to break down the path into manageable segments. This allows other sub-navigation task (corresponding to) or for more precise navigation and easier course corrections if needed.

(3) Executing the motion: The drone 100 moves along the determined target motion direction in several steps: a. A81: Horizontal motion from (0,0) to (1,0) b. A82: Vertical motion from starting cell (1,0) to waypoint WP1 (1,1) c. A83: Horizontal motion from (1,1) to (2,1) d. A84: Final vertical motion from (2,1) to the target cell (2,2).

(4) Continuous position updating: Throughout the motion, the system continuously updates the reference cell coordinates of the current reference cell, so as to maintain accurate positioning and determining subsequent motion directions.

(5) Reaching the destination: The drone 100 continues to move along the determined target motion directions until the currently determined reference cell coordinates are equal to the target cell coordinates (2,2).

Figure 8B:
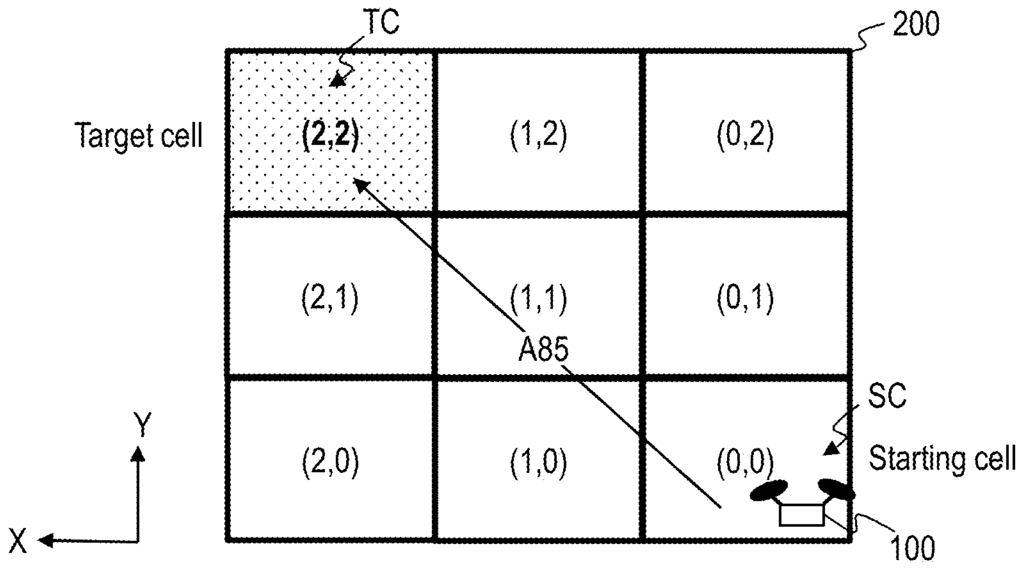
FIG. 8B is a schematic diagram of illustrating a drone moves based on a destination task of a navigation task related to a reference object according to a further embodiment of the present disclosure.

FIG. 8B is a schematic diagram of illustrating a drone moves based on a destination task of a navigation task related to a reference object according to a further embodiment of the present disclosure. Referring to FIG. 8B, this approach differs from the L-shaped or Z-shaped paths shown in previous examples, offering a more efficient route for the drone's motion.

The destination task in this embodiment is executed as follows:

(1) Determining cell coordinates: The system determines the reference cell coordinates of the starting cell SC (0,0) and the target cell coordinates of the target cell TC (2,2).

(2) Determining direct motion direction: Based on the current position and the target coordinates, the system calculates a direct path between the starting cell SC and the target cell TC. This direct path is represented by the arrow A85 in the figure.

(3) Executing the motion: The drone 100 moves along the determined direct path A85, which crosses through the cells (1,0), (1,1), and finally reaches (2,2). This diagonal motion allows the drone to reach its destination more efficiently than moving along cell lines.

(4) Continuous position updating: Throughout the motion, the system continuously updates the reference cell coordinates of the current reference cell.

(5) Real-time adjustment: As the drone 100 moves along path A85, the system constantly recalculates and adjusts the motion to maintain the most direct route to the target cell TC based on at least one method for determining the projected position and the reference cell provided above. This allows for corrections due to any slight deviations or environmental factors.

(6) Reaching the destination: The drone 100 continues to move along the determined direct path until the currently determined reference cell coordinates are equal to the target cell coordinates TC (2,2).

The system's ability to calculate and follow a direct path showcases the flexibility and advanced capabilities of the navigation method. This approach can significantly reduce travel time and energy consumption, especially in larger cell structures or when frequent motions between distant points are required.

FIG. 9A is a schematic diagram of illustrating reference lines shown by the images captured by the drone when the drone is in the middle of two reference objects according to an embodiment of the present disclosure. FIG. 9B is a schematic diagram of illustrating reference lines shown by the images captured by the drone when the drone is closer to the right reference object according to an embodiment of the present disclosure.

In an embodiment, FIG. 9A and FIG. 9B illustrate the method for positioning and navigating a drone 100 between two reference objects 200, utilizing the optical distortion-based navigation system. This approach demonstrates how the drone can maintain its position relative to multiple reference objects simultaneously, enhancing its navigational capabilities in complex environments.

FIG. 9A depicts the scenario where the drone 100 is positioned in the middle of two reference objects 200. The drone is equipped with two cameras, one on each side, capturing images IG1 and IG2 of the left and right reference objects respectively. These images show the reference lines of each object with similar levels of distortion, indicating that the drone is equidistant from both reference objects. As indicated by arrow A91 and A92, the reference lines in both IG1 and IG2 exhibit similar curvatures, suggesting the drone is nearly equidistant from both reference objects.

FIG. 9B illustrates a scenario where the drone 100 has moved closer to the right reference object 200. This is evident from the differences in the captured images IG3 and IG4 as indicated by arrow A93 and A94:

Image IG3: Shows less pronounced curvature in the reference lines, indicating the drone is further from the left reference object.

Image IG4: Displays more extreme curvature in the reference lines, signifying the drone's proximity to the right reference object.

The navigation method in this dual-reference object scenario operates as follows:

(1) Continuous Monitoring: The drone constantly captures and analyzes images from both cameras, comparing the curvatures of the reference lines in each image.

(2) Distortion Analysis: The system calculates the degree of distortion in each image, which correlates to the drone's distance from each reference object.

(3) Position Adjustment: If the distortions in the two images are unequal, as shown in FIG. 9B, the drone adjusts its position. It moves towards the reference object showing less distortion (in this case, towards the left) to balance its position.

(4) Maintaining Optimal Distance: While centering itself, the drone also ensures it maintains an appropriate distance from both reference objects. This is achieved by monitoring the overall magnitude of distortion in both images and adjusting its position along the Z-axis if necessary.

(5) Dynamic Adaptation: As the drone moves through the environment, it continuously updates its position based on the changing distortions in the captured images, allowing for smooth navigation between the reference objects.

This method of utilizing dual reference objects enhances the drone's navigational capabilities:

It allows for precise positioning in wider spaces or corridors.

Enables the drone to navigate safely between multiple structures.

Provides redundancy in navigation, as the drone can rely on either reference object if one becomes temporarily obscured.

By leveraging the optical distortion from multiple viewpoints, this system offers a robust solution for indoor drone navigation in complex environments with multiple reference structures. This approach is valuable in scenarios such as warehouse aisles, where maintaining a central path and equal distance from shelving units on both sides is useful for efficient and safe operation.

Figure 9D:
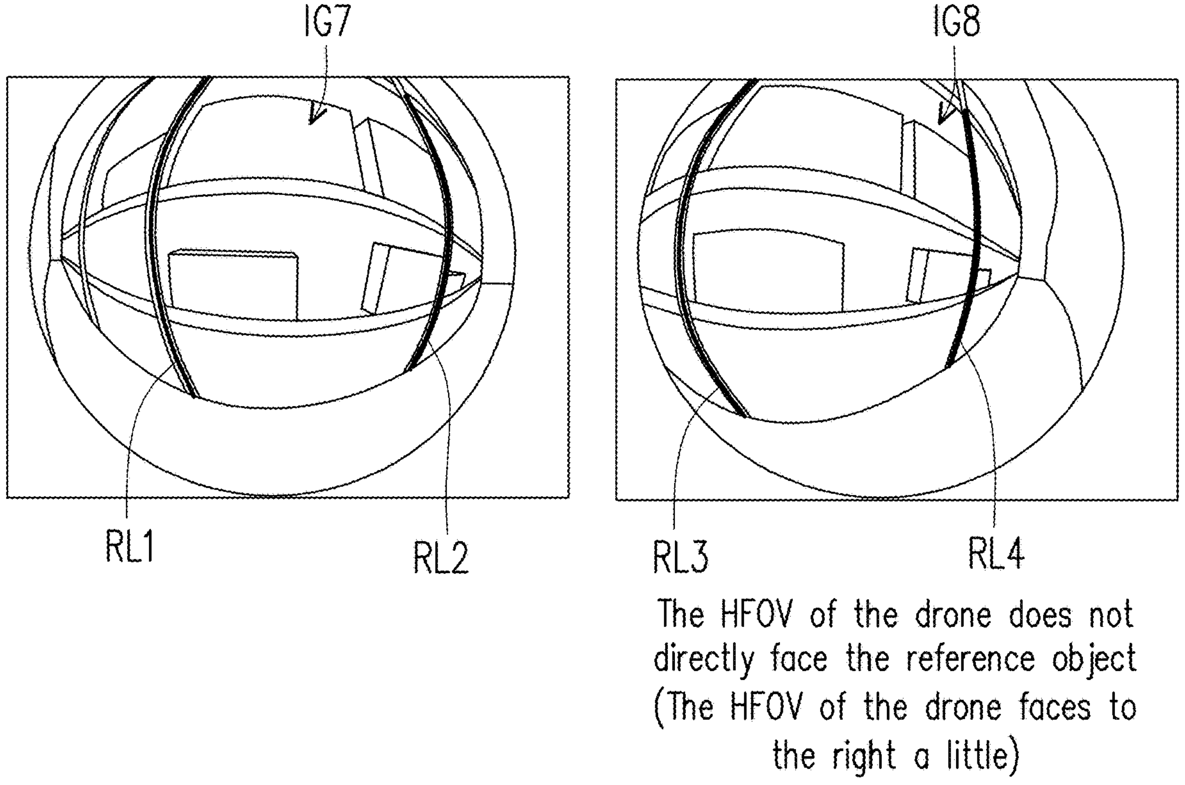
FIG. 9D is a schematic diagram of illustrating reference lines shown by the images captured by the drone when the drone's camera faces, by different angle, the reference object according to an embodiment of the present disclosure.

FIG. 9D is a schematic diagram of illustrating reference lines shown by the images captured by the drone when the drone's camera faces, by different angle, the reference object according to an embodiment of the present disclosure.

In an embodiment, FIG. 9D illustrates a schematic diagram of reference lines shown in images captured by the drone when its camera faces the reference object at different angles. This figure demonstrates the method for correcting the drone's pose to ensure the camera's horizontal field of view (HFOV) is properly aligned with the reference object.

The figure shows two captured images, IG7 and IG8, each displaying reference lines (RL1, RL2, RL3, RL4) that represent the boundaries of the reference object. In IG8, it's noted that the HFOV of the drone does not directly face the reference object, but is slightly tilted to the right.

The drone navigation method employs the following steps for pose correction:

(1) Determining boundary curvatures: The system determines the curvatures of four boundaries:

Left curvature (corresponding to RL1 in IG7 and RL3 in IG8);

Right curvature (corresponding to RL2 in IG7 and RL4 in IG8);

Upper curvature (top edges of IG7 and IG8); and

Lower curvature (bottom edges of IG7 and IG8).

(2) Calculating curvature differences:

First curvature difference: between the left curvature and the right curvature;

Second curvature difference: between the upper curvature and the lower curvature.

(3) Determining horizontal pose correction: The system compares the first curvature difference with a predefined first curvature difference threshold. If the difference exceeds this threshold, it indicates that the drone's horizontal orientation needs adjustment. In IG8, we can observe that RL3 shows larger curvature than RL4, indicating that the drone is tilted to the right. The system would determine the need for a first camera pose correction operation to align the HFOV horizontally with the reference object.

(4) Determining vertical pose correction: Similarly, the second curvature difference (between upper and lower curvatures) is compared with a second curvature difference threshold. If exceeded, it indicates a need for vertical pose adjustment. Although not as apparent in the given images, the system would use the same principle to determine based on the curvatures of the upper and lower boundaries if vertical alignment is necessary.

(5) Performing pose corrections:

If the first curvature difference exceeds the threshold, the system performs a first camera pose correction operation. This involves rotating the drone horizontally (e.g., turns the drone to adjust the HFOV to the left) until the updated first curvature difference falls below the threshold.

If the second curvature difference exceeds its threshold, a second camera pose correction operation is performed, adjusting the drone's vertical tilt.

(6) Continuous monitoring and adjustment: The system continuously monitors these curvature differences and performs adjustments as needed to maintain proper alignment with the reference object.

This pose correction method ensures that the drone's camera remains correctly oriented towards the reference object, which is important for accurate navigation and positioning. By maintaining a consistent and centered view of the reference object, the system can more reliably interpret the optical distortions and calculate the drone's position and motion.

Based on above, the drone navigation method based on optical distortion and the drone using the same provided by the present disclosure is capable of capturing images of an environment using a drone's camera with high optical distortion properties; detecting a reference object and reference lines in the images; monitoring curvatures of the lines; determining the drone's projected position in the reference cell based on curvatures of cell boundaries; and continuously updating the drone's projected position based on monitored boundary curvatures to manage the drone's motion. Such that, the present disclosure enables precise indoor navigation without relying on GPS or external markers, significantly enhancing drone operability in complex indoor environments such as warehouses and industrial facilities.

This innovative method provides several significant advantages:

GPS-Independent Navigation: By utilizing the inherent distortion of wide-angle or fisheye lenses, the system enables precise indoor navigation without relying on GPS signals, overcoming a major limitation of traditional navigation systems in enclosed spaces.

Infrastructure-Free Operation: The method eliminates the need for additional infrastructure or environmental markers, significantly reducing implementation costs and complexity in warehouse and industrial settings.

High Precision Positioning: Through continuous analysis of reference line curvatures, the system achieves highly accurate positioning and orientation, crucial for tasks such as inventory management and industrial inspections.

Adaptive Navigation: The ability to navigate using multiple reference objects and adjust to varying distances allows for flexible operation in complex environments, such as warehouse aisles or multi-level structures.

Real-Time Path Optimization: The system's capability to calculate and follow direct paths between points enhances efficiency in motion, reducing operation time and energy consumption.

Robust Pose Correction: Continuous monitoring and adjustment of the drone's orientation ensure consistent and accurate data capture, even in dynamic environments.

Scalability: The cell-based navigation system is easily scalable to larger and more complex environments, making it suitable for a wide range of industrial applications.

Versatile Task Execution: The method supports various navigation tasks, from systematic scanning of large areas to targeted motions, catering to diverse operational needs.

Cost-Effective Solution: By repurposing optical distortion, typically considered a drawback, into a navigational asset, the system offers a cost-effective alternative to expensive sensor arrays or infrastructure modifications.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A drone navigation method based on optical distortion, the method comprising:

capturing first images of an environment by a camera of a drone, wherein the camera has lens with high optical distortion properties;

detecting a reference object in the first images and a plurality of reference lines mapped to the reference object;

determining a plurality of cells formed by the reference lines, and monitoring a curvature of each reference line;

determining a reference cell among the cells, wherein the drone is located adjacent to the reference cell;

determining drone's projected position related to the reference object in the reference cell according to curvatures of a plurality of boundaries of the reference cell, comprising:

determining the curvature of each of boundaries of the reference cell;

calculating direction vectors corresponding to the boundaries based on the curvatures of the boundaries of the reference cell, wherein each direction vector comprises a first vector value corresponding to a first coordinate axis and a second vector value corresponding to a second coordinate axis;

determining the projected position relative to a cell center in the reference cell based on a sum of all the direction vectors, wherein the projected position of the drone is determined as at the cell center when the sum of all the direction vectors is 0;

determining a target motion direction according to a navigation task, and controlling the drone to move along the target motion direction; and continuously updating the projected position of the drone based on the currently monitored curvatures of the boundaries of the reference cell, so as to manage a motion of the drone for the navigation task according to the updated projected position.

2. The drone navigation method of claim 1, wherein the boundaries comprise a left boundary, a right boundary, an upper boundary and a lower boundary, the method further comprising:

determining a left curvature corresponding to the left boundary, a right curvature corresponding to the right boundary, an upper curvature corresponding to the upper boundary, and a lower curvature corresponding to the lower boundary;

determining whether to perform a first camera pose correction operation corresponding to the first coordinate axis based on a first curvature difference threshold and a first curvature difference between the left curvature and the right curvature, so that an updated first curvature difference after performing the first camera pose correction operation is less than the first curvature difference threshold; and determining whether to perform a second camera pose correction operation corresponding to the second coordinate axis based on a second curvature difference threshold and a second curvature difference between the upper curvature and the lower curvature, so that an updated second curvature difference after performing the second camera pose correction operation is less than the second curvature difference threshold.

3. The drone navigation method of claim 1, the method further comprising:

when a sum of absolute values of the curvatures is greater than a first curvature summation threshold, controlling the drone to move away from the reference object along a third coordinate axis; and when the sum of the absolute values of the curvatures is less than a second curvature summation threshold, controlling the drone to move closer to the reference object along the third coordinate axis.

4. The drone navigation method of claim 1, the method further comprising:

monitoring changes of curvatures of the boundaries of the reference cell;

determining, based on a change of a target curvature of a target boundary, whether the projected position of the drone has crossed the target boundary and entered a neighboring cell adjacent to the reference cell;

in response to determining that the projected position of the drone has crossed the target boundary and entered the neighboring cell, updating the neighboring cell as the current reference cell, and re-determining the projected position of the drone in the current reference cell.

5. The drone navigation method of claim 4, wherein the step of determining, based on the change of a target curvature of the target boundary, whether the projected position of the drone has crossed the target boundary and entered the neighboring cell adjacent to the reference cell comprises:

in response to monitoring that the curvature of one boundary has changed from a positive value to a negative value or from a negative value to a positive value, determining that the said one boundary is the target boundary and the projected position of the drone has crossed the target boundary and entered the neighboring cell.

6. The drone navigation method of claim 1, the method further comprising:

obtaining the overall structural information of the reference object to calculate the relative distances between each cell center of each of the cells of the reference object, and the length of each of the boundaries of each cell; and assigning a plurality of cell coordinates to all cells corresponding to the reference object.

7. The drone navigation method of claim 1, wherein the navigation task is a destination task for reaching a target cell, the method further comprising:

determining reference cell coordinates of the reference cell and target cell coordinates of the target cell;

continuously determining the target motion direction based on the reference cell coordinates of the current reference cell and the target cell coordinates; and controlling the drone to move along the determined target motion direction until the currently determined reference cell coordinates are equal to the target cell coordinates.

8. The drone navigation method of claim 1, wherein the step of detecting the reference object in the first images and the plurality of reference lines mapped to the reference object comprises:

emitting a specific light towards the reference object;

capturing second images of the reference object illuminated by the specific light;

distinguishing a structural outline of the reference object based on the second images, wherein first reflection coefficients of surfaces of the reference object are greater than second reflection coefficients of surfaces of other objects contained in the reference object; and virtually setting the plurality of reference lines on the structural outline of the reference object, such that the virtually set reference lines, mapped to the reference object, reflect the structural outline of the reference object.

9. The drone navigation method of claim 1, wherein the navigation task is a scanning structure task, the method further comprising:

(a) determining a starting cell among the cells of the reference object, a target row corresponding to the starting cell and a target direction for scanning the target row;

(b) controlling the drone to move horizontally along the target direction to scan the target row until reaching an end cell of the target row;

(c) controlling the drone to move vertically to an adjacent row, and updating the adjacent row as a new target row;

(d) determining a new target direction, opposite to the old target direction, for scanning the new target row of the cells;

(e) controlling the drone to move horizontally along the new target to scan the new target row of the cells until reaching an end cell of the new target row;

(f) repeating steps (c) to (e) until all rows of the cells of the reference object have been scanned, wherein the current reference cell is updated continuously during the motion; and (g) returning the drone to the starting cell.

10. A drone based on optical distortion, comprising:

a camera having lens with high optical distortion properties;

a motion device, configure to enable the drone to move along three orthogonal axes in a three-dimensional space; and a processor, coupled to the camera and the motion device, wherein the processor is configured to execute program modules to:

capture, by the camera, first images of an environment;

detect a reference object in the first images and a plurality of reference lines mapped to the reference object;

determine a plurality of cells formed by the reference lines, and monitoring a curvature of each reference line;

determine a reference cell among the cells, wherein the drone is located adjacent to the reference cell;

determine drone's projected position related to the reference object in the reference cell according to curvatures of a plurality of boundaries of the reference cell, wherein the processor is further configured to:

determine the curvature of each of boundaries of the reference cell;

calculate direction vectors corresponding to the boundaries based on the curvatures of the boundaries of the reference cell, wherein each direction vector comprises a first vector value corresponding to a first coordinate axis and a second vector value corresponding to a second coordinate axis; and determine the projected position relative to a cell center in the reference cell based on a sum of all the direction vectors, wherein the projected position of the drone is determined as at the cell center when the sum of all the direction vectors is 0;

determine a target motion direction according to a navigation task, and control the drone to move along the target motion direction by instructing the motion device; and continuously update the projected position of the drone based on the currently monitored curvatures of the boundaries of the reference cell, so as to manage a motion of the drone for the navigation task according to the updated projected position.

11. The drone of claim 10, wherein the boundaries comprise a left boundary, a right boundary, an upper boundary and a lower boundary, wherein the processor is further configured to:

determine a left curvature corresponding to the left boundary, a right curvature corresponding to the right boundary, an upper curvature corresponding to the upper boundary, and a lower curvature corresponding to the lower boundary;

determine whether to perform a first camera pose correction operation corresponding to the first coordinate axis based on a first curvature difference threshold and a first curvature difference between the left curvature and the right curvature, so that an updated first curvature difference after performing the first camera pose correction operation is less than the first curvature difference threshold; and determine whether to perform a second camera pose correction operation corresponding to the second coordinate axis based on a second curvature difference threshold and a second curvature difference between the upper curvature and the lower curvature, so that an updated second curvature difference after performing the second camera pose correction operation is less than the second curvature difference threshold.

12. The drone of claim 10, wherein the processor is further configured to:

when a sum of absolute values of the curvatures is greater than a first curvature summation threshold, control the drone to move away from the reference object along a third coordinate axis; and when the sum of the absolute values of the curvatures is less than a second curvature summation threshold, control the drone to move closer to the reference object along the third coordinate axis.

13. The drone of claim 10, wherein the processor is further configured to:

monitor changes of curvatures of the boundaries of the reference cell;

determine, based on a change of a target curvature of a target boundary, whether the projected position of the drone has crossed the target boundary and entered a neighboring cell adjacent to the reference cell;

in response to determining that the projected position of the drone has crossed the target boundary and entered the neighboring cell, update the neighboring cell as the current reference cell, and re-determine the projected position of the drone in the current reference cell.

14. The drone of claim 13, wherein the step of determining, based on the change of a target curvature of the target boundary, whether the projected position of the drone has crossed the target boundary and entered the neighboring cell adjacent to the reference cell comprises:

in response to monitoring that the curvature of one boundary has changed from a positive value to a negative value or from a negative value to a positive value, determining that the said one boundary is the target boundary and the projected position of the drone has crossed the target boundary and entered the neighboring cell.

15. The drone of claim 10, wherein the processor is further configured to:

obtain the overall structural information of the reference object to calculate the relative distances between each cell center of each of the cells of the reference object, and the length of each of the boundaries of each cell; and assign a plurality of cell coordinates to all cells corresponding to the reference object.

16. The drone of claim 10, wherein the navigation task is a destination task for reaching a target cell, wherein the processor is further configured to:

determine reference cell coordinates of the reference cell and target cell coordinates of the target cell;

continuously determine the target motion direction based on the reference cell coordinates of the current reference cell and the target cell coordinates; and control the drone to move along the determined target motion direction until the currently determined reference cell coordinates are equal to the target cell coordinates.

17. The drone of claim 1, wherein the step of detecting the reference object in the first images and the plurality of reference lines mapped to the reference object comprises:

emitting a specific light towards the reference object;

capturing second images of the reference object illuminated by the specific light;

distinguishing a structural outline of the reference object based on the second images, wherein first reflection coefficients of surfaces of the reference object are greater than second reflection coefficients of surfaces of other objects contained in the reference object; and virtually setting the plurality of reference lines on the structural outline of the reference object, such that the virtually set reference lines, mapped to the reference object, reflect the structural outline of the reference object.

18. The drone of claim 10, wherein the navigation task is a scanning structure task, wherein the processor is further configured to:

(a) determine a starting cell among the cells of the reference object, a target row corresponding to the starting cell and a target direction for scanning the target row;

(b) control the drone to move horizontally along the target direction to scan the target row until reaching an end cell of the target row;

(c) control the drone to move vertically to an adjacent row, and updating the adjacent row as a new target row;

(d) determine a new target direction, opposite to the old target direction, for scanning the new target row of the cells;

(e) control the drone to move horizontally along the new target to scan the new target row of the cells until reaching an end cell of the new target row;

(f) repeat steps (c) to (e) until all rows of the cells of the reference object have been scanned, wherein the current reference cell is updated continuously during the motion; and (g) return the drone to the starting cell.

* * * * *